US006868258B2

(12) United States Patent
Hayata et al.

(10) Patent No.: US 6,868,258 B2
(45) Date of Patent: Mar. 15, 2005

(54) STRUCTURE FOR CONNECTING NON-RADIATIVE DIELECTRIC WAVEGUIDE AND METAL WAVEGUIDE, MILLIMETER WAVE TRANSMITTING/RECEIVING MODULE AND MILLIMETER WAVE TRANSMITTER/RECEIVER

(75) Inventors: Kazuki Hayata, Kyoto (JP); Kazuhiro Matsui, Kyoto (JP); Nobuki Hiramatsu, Kyoto (JP)

(73) Assignee: Kyocera Corporation, Kyoto (JP)

( * ) Notice: Subject to any disclaimer, the term of this patent is extended or adjusted under 35 U.S.C. 154(b) by 662 days.

(21) Appl. No.: 09/845,048

(22) Filed: Apr. 26, 2001

(65) Prior Publication Data

US 2001/0049266 A1 Dec. 6, 2001

(30) Foreign Application Priority Data

Apr. 26, 2000 (JP) .................................... P2000-126348
Aug. 31, 2000 (JP) .................................... P2000-262293
Sep. 25, 2000 (JP) .................................... P2000-291097

(51) Int. Cl.[7] .................................................. H04B 1/46
(52) U.S. Cl. ........................... 455/81; 455/80; 455/269; 333/113
(58) Field of Search ........................... 455/81, 80, 129, 455/269, 280, 281, 282, 328; 333/113, 114

(56) References Cited

U.S. PATENT DOCUMENTS 5,453,755 A * 9/1995 Nakano et al. ............. 343/872
5,815,123 A 9/1998 Uematsu et al.

FOREIGN PATENT DOCUMENTS

DE 3 122 134 12/1982
JP DE19-600516 7/1996
JP 2000-022407 1/2000
JP 2000022407 A * 1/2000 ............. H01P/5/08
JP 2000-022408 1/2000
JP 2000-114822 4/2000

OTHER PUBLICATIONS

Abstract of Patent No. JP8–191211, publication date Jul. 23, 1996—Planar Antenna System for Automobile Collision Avoidance Systems, Kazunari, et al.

* cited by examiner

*Primary Examiner*—Vivian Chin
*Assistant Examiner*—Minh D. Dao
(74) *Attorney, Agent, or Firm*—Hogan & Hartson LLP

(57) ABSTRACT

It is an object of the invention to provide a connection structure for connecting the dielectric strip of an NRD guide with a metal waveguide, in which the conversion loss (connection loss) for high-frequency signals is reduced, and in which the NRD guide as well as the millimeter wave integrated circuit in which the NRD guide is incorporated can be made smaller. A non-radiative dielectric waveguide is made by arranging a dielectric strip for propagating high-frequency signals between parallel planar conductors arranged at a spacing of not more than half the wavelength of a high-frequency signal, a conductive member being arranged at an end face of a terminal end of the dielectric strip. An aperture is formed in at least one of the parallel planar conductors at a location where the electrical field of an LSM mode stationary wave propagating along the dielectric strip becomes largest. An open terminal end of a metal waveguide is connected to this aperture.

26 Claims, 15 Drawing Sheets

STRUCTURE FOR CONNECTING NON-RADIATIVE DIELECTRIC WAVEGUIDE AND METAL WAVEGUIDE, MILLIMETER WAVE TRANSMITTING/RECEIVING MODULE AND MILLIMETER WAVE TRANSMITTER/RECEIVER

BACKGROUND OF THE INVENTION

1. Field of the Invention

The present invention relates to a structure for connecting a non-radiative dielectric waveguide and a metal waveguide, which is incorporated in, for example, a millimeter wave integrated circuit and used for the transmission of high frequency signals, and capable of transmitting and receiving high-frequency signals inform of radiowaves. The invention also relates to a millimeter wave transmitting/receiving module and a millimeter wave transmitter/receiver.

2. Description of the Related Art

Conventionally, non-radiative dielectric waveguides (also referred to as “NRD guides” in the following), in which a dielectric strip is sandwiched between a pair of parallel planar conductors, are known as one type of transmission line for high-frequency signals. When an NRD guide is incorporated on a printed circuit board or the like, the circuit has to be designed such that the NRD guide can be connected to other high-frequency transmission lines, antennas, etc., in which case it is important to design the connection such that the deterioration of the transmission characteristics is kept small.

As an alternative structure for connecting a high-frequency transmission line, a structure for connecting an NRD guide and a micro-strip line has been proposed. A general structure thereof is shown in FIG. 19. In the NRD guide shown in FIG. 19, a dielectric strip 3 is arranged between a pair of parallel planar conductors 11, 12. A slot hole 13 is formed in the parallel planar conductor 11, and a dielectric substrate 14 on which a central conductor 15 is formed is placed on the surface including the slot hole 13 in the parallel planar conductor 11, such that the slot hole 13 is arranged in a predetermined positional relation with respect to a terminal end of the central conductor 15, whereby the NRD guide can be connected electromagnetically to a microstrip line through the slot hole 13.

In another configuration for connecting the dielectric strip of an NRD guide to a metal waveguide (not shown in the drawings), an output end or an input end of the dielectric strip is taper-shaped, and one end of a rectangular horn-shaped metal waveguide is placed near that tapered portion.

As another structure for connecting an NRD guide to a metal waveguide, it has been proposed to provide an aperture in a portion of the parallel planar waveguides corresponding to the dielectric strip, and to connect this aperture to the open end of the metal waveguide (see Japanese Unexamined Patent Publication JP-A 2000-22407).

However, when the dielectric strip of an NRD guide is provided with a taper-shaped end, as described above, to connect the dielectric strip to a metal waveguide, the length of this tapered portion has to be at least twice the wavelength of the high-frequency signal, so that there is the drawback that it is not suitable for the miniaturization of a millimeter wave integrated circuit.

On the other hand, the configuration shown in FIG. 19 is suitable for miniaturization, but for high-frequency signals in the millimeter waveband of at least 30 GHz, the transmission loss when using a microstrip line is large, so that this conventional connection structure is not suited for circuit boards in which the signal frequency is 30 GHz or higher.

It is known that a metal waveguide can be used instead of a microstrip line as a propagation structure with low transmission loss, like an NRD guide, in the millimeter wave band above 30 GHz, and it is also important to use metal waveguides in circuit design. In one example, an aperture is provided in the portion of the parallel planar conductor that corresponds to the dielectric strip, and this aperture is connected with the open terminal end of the dielectric strip (see JP-A 2000-22407). However, with this configuration, signals tend to be reflected and leak at the portion connecting the dielectric strip and the portion of the portion of the parallel planar conductor corresponding to the dielectric strip, and this structure is not satisfactory with respect to keeping signal losses small.

SUMMARY OF THE INVENTION

In view of the problems of the related art, it is an object of the invention to provide a smaller connection structure with which transmission in the millimeter wave band above 30 GHz is possible with low loss, and which can transmit and receive high-frequency wave signals as radio waves.

The invention provides a structure for connecting a non-radiative dielectric waveguide and a metal waveguide comprising:

a non-radiative dielectric waveguide including:

parallel planar conductors arranged at a spacing of not more than half the wavelength of a high-frequency signal, and a dielectric strip for propagating the high-frequency signal, the dielectric strip being disposed between the parallel planar conductors and provided at an end face of a terminal end of the dielectric strip with a conductive member; and a metal waveguide having an open terminal end connected to an aperture which is formed in at least one of the parallel planar conductors at a location where an electrical field of an LSM mode stationary wave propagating along the dielectric strip becomes largest.

According to the invention, with this configuration, an NRD guide and a metal waveguide can be connected with low connection loss, signal leakage, reflection, and transmission loss, and the connection structure can be minimized. It should be noted that a spacing of not more than half the wavelength of a high-frequency signal corresponds to the wavelength of the high-frequency signal in air.

Further the invention provides a structure for connecting a non-radiative dielectric waveguide and a metal waveguide comprising:

a non-radiative dielectric waveguide including:

parallel planar conductors arranged at a spacing of not more than half the wavelength of a high-frequency signal, and a dielectric strip for propagating the high-frequency signal, the dielectric strip being disposed between the parallel planar conductors and provided at an end face of a terminal end of the dielectric strip with a conductive member; and a metal waveguide having terminal ends one of which is closed and the other of which is open, an aperture being formed in at least one of the parallel planar conductors at a location where an electrical field of an LSM mode stationary wave propagating along the dielectric strip becomes largest, the aperture being connected with an aperture provided in a lateral face of the metal waveguide having the closed terminal end and open terminal end, at a position of n/2+¼ (wherein n is an integer of 0 or greater) times the wavelength in the waveguide from the closed terminal.

According to the invention, with this configuration, the lateral face of the metal waveguide can be arranged in parallel to the planes of the parallel planar conductors, and as a result, the connection strength of the metal waveguide can be increased. Also, the entire NRD waveguide can be made thinner, and used in an upright orientation, so that it can be placed in a narrow space. Moreover, by making the connection at a location where the electric field strength of the stationary wave generated by the closed terminal end becomes largest, at the location closest to the closed terminal end of the metal waveguide, the connection loss can be minimized, and the electromagnetic wave proceeds through the metal waveguide substantially only in the direction toward the open terminal end, which minimizes the transmission loss as a result.

Further the invention provides a structure for connecting a non-radiative dielectric waveguide and a metal waveguide comprising:

a non-radiative dielectric waveguide including:

parallel planar conductors arranged at a spacing of not more than half the wavelength of a high-frequency signal, a dielectric strip for propagating the high-frequency signal, the dielectric strip being disposed between the parallel planar conductors, and electromagnetic shielding members arranged along both sides of a terminal end of the dielectric strip; and a metal waveguide having an open terminal end connected to an aperture which is formed in at least one of the parallel planar conductors at a location where an electrical field of an LSM mode stationary wave propagating along the dielectric strip becomes largest.

According to the invention, with this configuration, an NRD guide and a metal waveguide can be connected with low connection loss, signal leakage, reflection, and transmission loss, and the connection structure can be minimized. It should be noted that a spacing of not more than half the wavelength of a high-frequency signal corresponds to the wavelength of the high-frequency signal in air.

Further the invention provides a structure for connecting a non-radiative dielectric waveguide and a metal waveguide comprising:

a non-radiative dielectric waveguide including:

parallel planar conductors arranged at a spacing of not more than half the wavelength of a high-frequency signal, a dielectric strip for propagating the high-frequency signal, the dielectric strip being disposed between the parallel planar conductors, and electromagnetic shielding members arranged along both sides of a terminal end of the dielectric strip; and a metal waveguide having terminal ends one of which is closed and the other of which is open, an aperture being formed in at least one of the parallel planar conductors at a location where an electrical field of an LSM mode stationary wave propagating along the dielectric strip becomes largest, the aperture being connected with an aperture provided in a lateral face of the metal waveguide having the closed terminal end and open terminal end, at a position of n/2+¼ (wherein n is an integer of 0 or greater) times the wavelength in the waveguide from the closed terminal.

According to the invention, with this configuration, the lateral face of the metal waveguide can be arranged in parallel to the planes of the parallel planar conductors, and as a result, the connection strength of the metal waveguide can be increased. Also, the entire NRD waveguide can be made thinner, and used in an upright orientation, so that it can be placed in a narrow space. Moreover, by making the connection at a location where the electric field strength of the stationary wave generated by the closed terminal end becomes largest, at the location closest to the closed terminal end of the metal waveguide, the connection loss can be minimized, and the electromagnetic wave proceeds through the metal waveguide substantially only in the direction toward the open terminal end, which minimizes the transmission loss as a result.

It is preferable that electromagnetic shielding members are provided so as to enclose an end face and side faces of the terminal end of the dielectric strip.

According to the invention, with this configuration, high-frequency signals leaking from the terminal end of the dielectric strip can be suppressed even more effectively.

The invention provides a millimeter wave transmitting/receiving module comprising:

the connection structure mentioned above; and an aperture antenna or flat antenna connected to the open terminal of the metal waveguide of the connection structure.

According to the invention, with this configuration, the high-frequency signal can be transmitted and received as a radio wave, so that the invention can be applied to an automobile millimeter wave radar system having highly efficient transmission characteristics. Preferably, the open terminal end of the metal waveguide is devised as a horn antenna, so that the open terminal end can be used as an antenna, which makes the connection loss due to the connection portion with a separate antenna member smaller in comparison with a case where a separate antenna member is provided.

The invention provides a millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip, one end of the second dielectric strip being disposed near the first dielectric strip so as to be electromagnetically coupled, or being joined to the first dielectric strip;

a circulator having a first connection portion, a second connection portion, and a third connection portion arranged at predetermined spacings along a perimeter of a ferrite disk arranged in parallel to the parallel planar conductors, which connection portions serve as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitter/receiver antenna at a front end thereof;

a fourth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the fourth dielectric strip propagating a received wave that is received with the transmitter/receiver antenna, propagated along the third dielectric strip, and outputted from the third connection portion of the circulator, toward the mixer, the first to fourth dielectric strips, the variable capacitance diode, the circulator and the mixer portion being arranged between the parallel planar conductors, wherein a conductive member is provided at an end face of a terminal end of the third dielectric strip, and an aperture is formed in at least one of the parallel planar conductors at a location where the electrical field of an LSM mode stationary wave propagating along the third dielectric strip becomes largest, the millimeter wave transmitter/receiver comprising:

a metal waveguide having an open terminal end connected to the aperture, and the other end at which the transmitter/receiver antenna is provided.

According to the invention, in the millimeter wave transmitter/receiver with this configuration, the transmission loss of the millimeter wave signal is low, so that it has excellent transmission characteristics, and as a result, the detection distance of a millimeter wave radar can be increased.

Further the invention provides a millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip having one end disposed near the first dielectric strip so as to be electromagnetically coupled, or joined to the first dielectric strip;

a circulator having a first connection portion, a second connection portion, and a third connection portion arranged at predetermined spacings along a perimeter of a ferrite disk arranged in parallel to the parallel planar conductors, and serving as input/output terminals for the millimeter wave signal, the circulator outputting the millimeter wave signal inputted into one of the connection portions from another connection portion that is adjacent in clockwise or anticlockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitting antenna at a front end thereof;

a fourth dielectric strip provided with a receiving antenna at a front end thereof;

a fifth dielectric strip connected to the third connection portion of the circulator, for propagating a millimeter wave signal received and mixed with the transmitting antenna and attenuating the millimeter wave signal at a non-reflective terminal end arranged at a front end of the fifth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the mixer being provided at the other end of the fourth dielectric strip, the first to fifth dielectric strips, the variable capacitance diode, the circulator and the mixer portion being arranged between the parallel planar conductors, wherein a conductive member is provided at an end face of a terminal end of each of the third and fourth dielectric strips, and an aperture is formed in at least one of the parallel planar conductors at a location where the electrical field of an LSM mode stationary wave propagating along each of the third and fourth dielectric strip becomes largest, the millimeter wave transmitter/receiver comprising:

metal waveguides having an open terminal end connected to the aperture, and the other end at which the transmitting antenna or the receiving antenna is provided.

According to the invention, in the millimeter wave transmitter/receiver with this configuration, the transmission millimeter wave signal is not fed through the circulator into the mixer, and as a result, the noise in received signals can be reduced and the detection distance can be increased, and the transmission characteristics of the millimeter wave signal are excellent, increasing the detection distance of a millimeter wave radar even further.

In the millimeter wave transmitter/receiver, it is preferable that one end of the second dielectric strip is placed near the third dielectric strip for electromagnetic coupling, or one end of the second dielectric strip is joined to the third dielectric strip, so that a portion of the millimeter wave signal is propagated toward the mixer.

According to the invention, with this configuration, the same operational effect as above can be attained.

In the millimeter wave transmitter/receiver, it is preferable that an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and a signal branching portion of the first dielectric strip and the second dielectric strip, such that a direction of an electric field of the millimeter wave signal coincides with a direction in which the bias voltage is applied to the amplitude modulation diode.

According to the invention, with this configuration, it is possible to obtain a millimeter wave transmitter/receiver for a millimeter wave radar module or the like, which amplitude-modulates and transmits/receives millimeter wave signals, and which has excellent transmission characteristics for millimeter wave signals, making it possible to increase the detection distance of the millimeter wave radar.

The invention provides a millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip, one end of the second dielectric strip being disposed near the first dielectric strip so as to be electromagnetically coupled, or being joined to the first dielectric strip;

a circulator having a first connection portion, a second connection portion, and a third connection portion arranged at predetermined spacings along a perimeter of a ferrite disk arranged in parallel to the parallel planar conductors, which connection portions serve as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitter/receiver antenna at a front end thereof;

a fourth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the fourth dielectric strip propagating a received wave that is received with the transmitter/receiver antenna, propagated along the third dielectric strip, and outputted from the third connection portion of the circulator, toward the mixer, the first to fourth dielectric strips, the variable capacitance diode, the circulator and the mixer portion being arranged between the parallel planar conductors, wherein electromagnetic shielding members are provided along lateral faces of a terminal end of the third dielectric strip, and an aperture is formed in at least one of the parallel planar conductors at a location where the electrical field of an LSM mode stationary wave propagating along the third dielectric strip becomes largest, the millimeter wave transmitter/receiver comprising:

a metal waveguide having an open terminal end connected to the aperture, and the other end at which the transmitter/receiver antenna is provided.

According to the invention, in the millimeter wave transmitter/receiver with this configuration, the transmission loss of the millimeter wave signal is low, so that it has excellent transmission characteristics, and as a result, the detection distance of a millimeter wave radar can be increased.

Further the invention provides a millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip having one end disposed near the first dielectric strip so as to be electromagnetically coupled, or joined to the first dielectric strip;

a circulator having a first connection portion, a second connection portion, and a third connection portion arranged at predetermined spacings along a perimeter of a ferrite disk arranged in parallel to the parallel planar conductors, and serving as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitting antenna at a front end thereof;

a fourth dielectric strip provided with a receiving antenna at a front end thereof;

a fifth dielectric strip connected to the third connection portion of the circulator, for propagating a millimeter wave signal received and mixed with the transmitting antenna and attenuating the millimeter wave signal at a non-reflective terminal end arranged at a front end of the fifth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the mixer being provided at the other end of the fourth dielectric strip, the first to fifth dielectric strips, the variable capacitance diode, the circulator and the mixer portion being arranged between the parallel planar conductors, wherein an electromagnetic shielding member is provided along lateral faces of a terminal end of each of the third and fourth dielectric strips, and an aperture is formed in at least one of the parallel planar conductors at a location where the electrical field of an LSM mode stationary wave propagating along each of the third and fourth dielectric strip becomes largest, the millimeter wave transmitter/receiver comprising:

metal waveguides having an open terminal end connected to the aperture, and the other end at which the transmitting antenna or the receiving antenna is provided.

According to the invention, in the millimeter wave transmitter/receiver with this configuration, the transmission millimeter wave signal is not fed through the circulator into the mixer, and as a result, the noise in received signals can be reduced and the detection distance can be increased, and the transmission characteristics of the millimeter wave signal are excellent, increasing the detection distance of a millimeter wave radar even further.

In this millimeter wave transmitter/receiver, it is preferable that one end of the second dielectric strip is placed near the third dielectric strip for electromagnetic coupling, or one end of the second dielectric strip is joined to the third dielectric strip, so that a portion of the millimeter wave signal is propagated toward the mixer.

According to the invention, with this configuration, the same operational effect as above can be attained.

In the millimeter wave transmitter/receiver, it is preferable that an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and the signal branching portion of the first dielectric strip and the second dielectric strip, such that a direction of an electric field of the millimeter wave signal coincides with a direction in which a bias voltage is applied to the amplitude modulation diode.

According to the invention, with this configuration, it is possible to obtain a millimeter wave transmitter/receiver for a millimeter wave radar module or the like, which amplitude-modulates and transmits/receives millimeter wave signals, and which has excellent transmission characteristics for millimeter wave signals, making it possible to increase the detection distance of the millimeter wave radar.

BRIEF DESCRIPTION OF THE DRAWINGS

Other and further objects, features, and advantages of the invention will be more explicit from the following detailed description taken with reference to the drawings wherein:

FIG. 1A is a perspective view illustrating how a metal waveguide is connected to a dielectric strip in a direction perpendicular to the principal surface of the parallel planar conductors; FIG. 1B is a partially transparent perspective view illustrating how the parallel planar conductor is provided with an aperture in correspondence to the location where the electric field of the stationary wave of the LSM mode propagating through the dielectric strip becomes largest; and FIG. 1C is a partially transparent perspective view illustrating how the shorted terminal ends of the dielectric strip are provided with electromagnetic shielding members;

FIG. 11A is a partially transparent perspective view illustrating how electromagnetic shielding plates are provided on both sides of the open terminal ends of the dielectric strip; and FIG. 11B is a perspective view illustrating how the metal waveguide is connected to the dielectric strip in a direction perpendicular to the principal surface of the parallel planar conductors;

DETAILED DESCRIPTION OF THE PREFERRED EMBODIMENTS

Figure 1A:
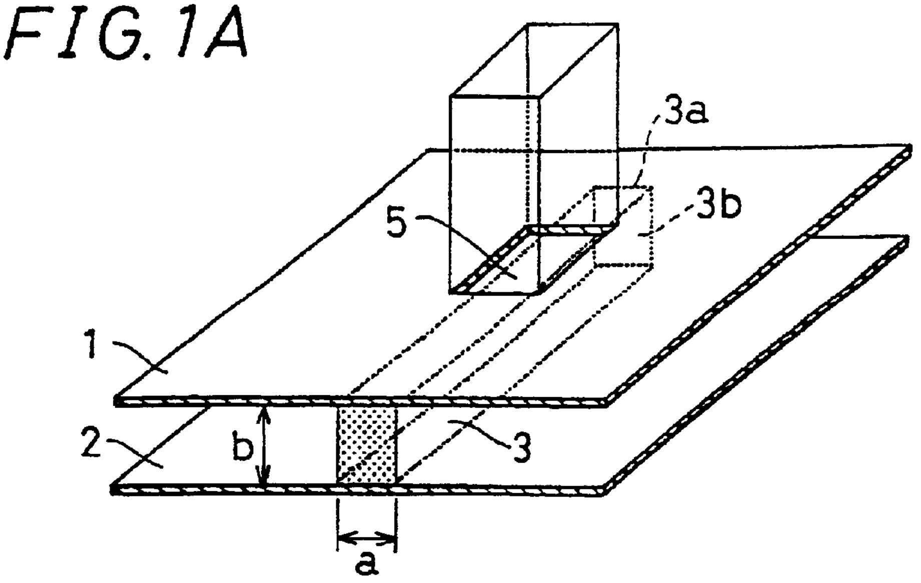
FIGS. 1A to 1C show a connection structure in accordance with the invention.

Now referring to the drawings, preferred embodiments of the invention are described below.

The following is a detailed description of an NRD guide of the invention. FIGS. 1A to C, FIG. 4, FIG. 5 and FIG. 6 are perspective views of NRD guides in accordance with the invention. As shown in these drawings, an NRD guide in accordance with the invention includes a dielectric strip 3 with a rectangular cross section a×b, and is arranged between a pair of parallel planar conductors 1 and 2. The dielectric strip 3 is provided with a closed terminal end 3*a*. A conductive member 3*b* made of a conductive plate or a conductive layer having substantially the same shape as the end face of the terminal end 3*a* is placed at the end face of the terminal end 3*a*. Thus, the terminal end 3*a* is shorted with respect to high-frequency signals. As shown in FIG. 3, when the end face of the terminal end 103*a* is open with respect to high-frequency signals, then the electromagnetic field spreads in the direction extending the dielectric strip 103, so that the distribution of the electromagnetic field in the dielectric strip 103 changes when other metal components are located near the end face in the direction extending the dielectric strip 103, which makes it necessary to separate the end face by at least λ/4 from such other metal components. With the configuration with the shorted end face as shown in FIG. 2, on the otherhand, it is possible to place other metal components directly next to the end face of the terminal end 3*a*, which makes miniaturization possible.

For the conductive member 3*b*, an electromagnetic shielding member B3 whose surface area is larger than that of the end face of the terminal end 3*a* may be used. In that case, the electromagnetic shielding effect in the direction extending the terminal end 3*a* is increased. Alternatively, a conductive member 3*b* made of a conductive plate or a conductive layer having substantially the same shape as the end face of the terminal end 3*a* may be also provided, and further the electromagnetic shielding member B3 may be placed at a certain distance from the end face. Also, the conductive member 3*b* can be in conductive contact with the parallel planar conductors 1, 2, or it can be separate (no contact) from the parallel planar conductors 1, 2. That is to say, it is sufficient when the presence of the conductive member 3*b* provides the electric field of the stationary wave of the high-frequency signal with the distribution shown in FIG. 2.

Figure 2:
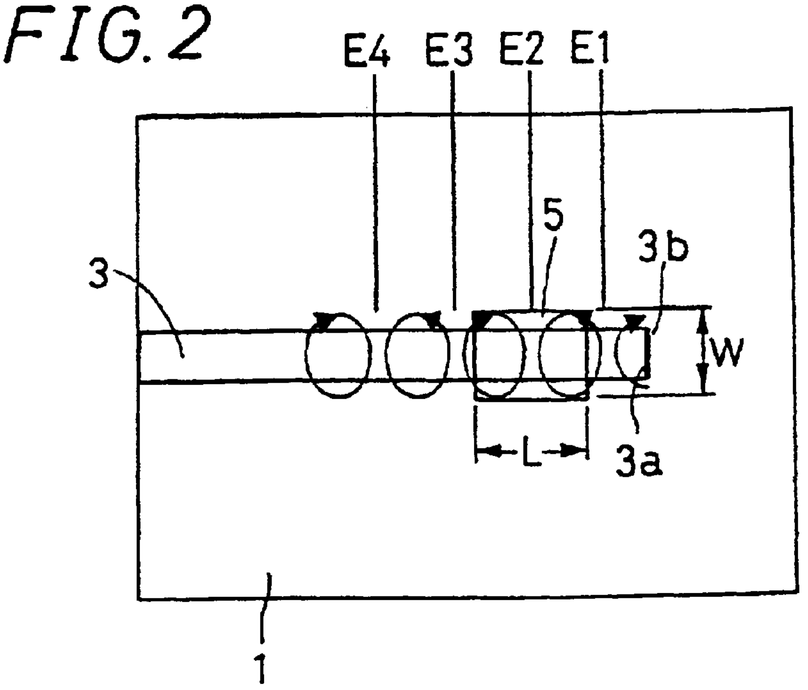
FIG. 2 is a plan view illustrating the electric field distribution along the dielectric strip in an NRD guide of the invention.
Figure 3:
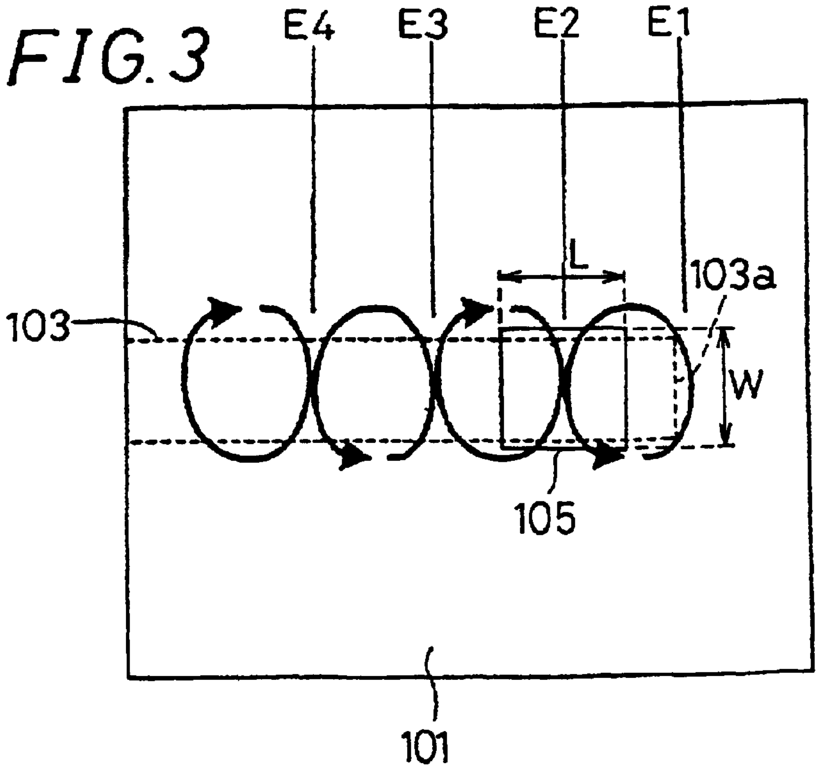
FIG. 3 is a plan view illustrating the electric field distribution when the end face of the terminal end of the dielectric strip in the NRD guide is open with respect to high-frequency signals.

In the invention, an aperture 5 is provided at a portion where the electric field of this stationary wave is strong, that is, at any of the locations E1, E2, E3, E4 of the parallel planar conductor 1 in FIG. 2, to connect the dielectric strip 3 to the metal waveguide 4, the aperture 5 having one of the locations E1, E2, E3, E4 at its center. E1 is located closest to the terminal end 3*a* of the dielectric strip 3, and E2, E3 and E4 are located at the positions that are removed from the terminal end 3*a* by a length of n/2+¼ times the wavelength in the waveguide (wherein n=1, 2, 3). With regard to keeping losses low, it is preferable that the place where the dielectric strip 3 is connected to the metal waveguide 4 is provided with an aperture 5 at E2, E3 or E4. Furthermore, with regard to keeping losses low and achieving miniaturization, it is even more preferable that it is at E2.

Figure 4:
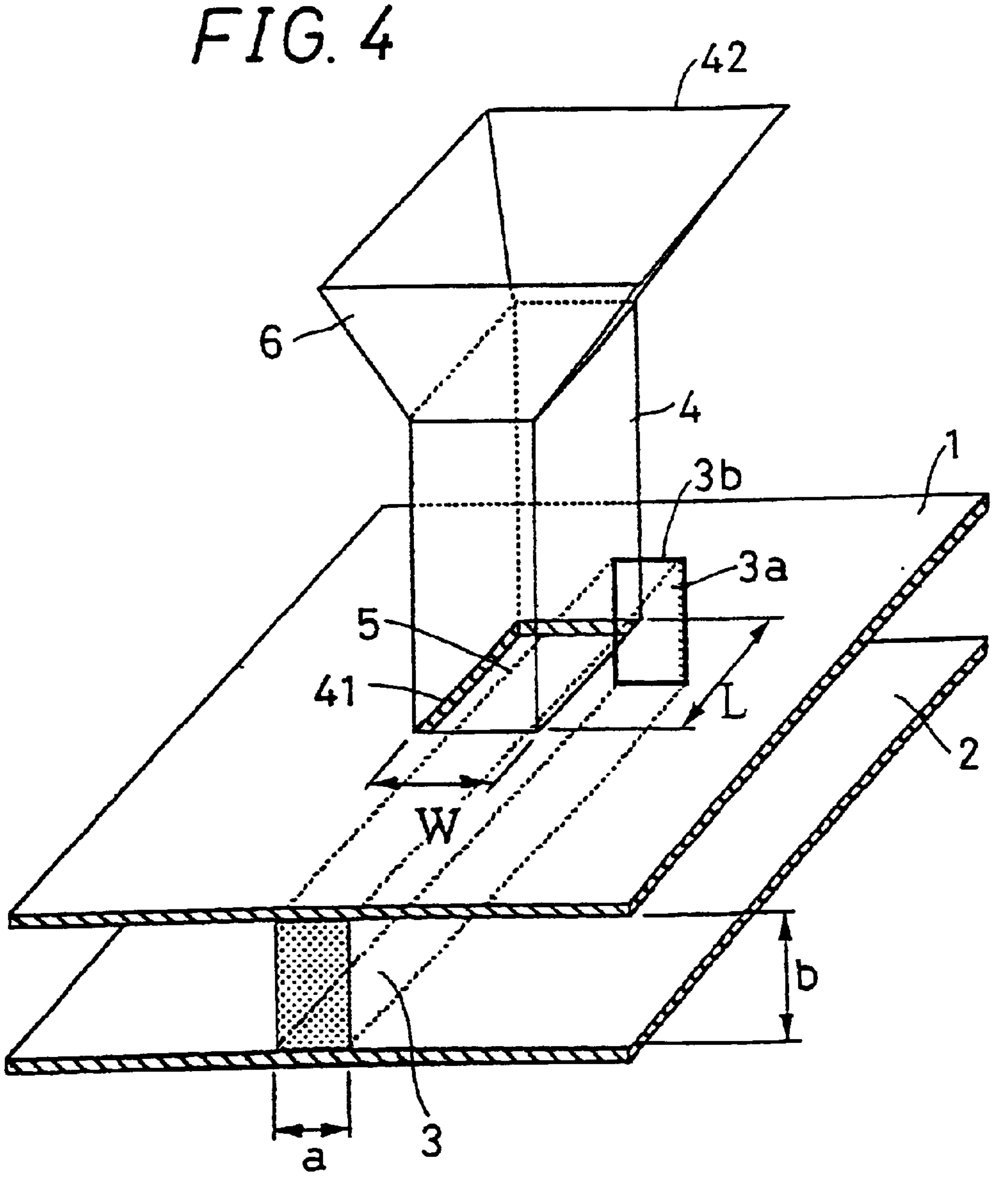
FIG. 4 is a perspective view showing an embodiment of the invention, in which a metal waveguide is connected to a dielectric strip in a direction perpendicular to a principal surface of the parallel planar conductors, the open terminal end of the metal waveguide on the other side being provided with a horn antenna.

The dielectric strip 3 of the NRD guide and the metal waveguide 4 are connected by the aperture 5 provided in the parallel planar conductor 1. The connection is configured such that the direction of the electric fields in the dielectric strip 3 and the metal waveguide 4 coincide with one another. That is to say, as shown in FIG. 4, an open terminal end 41 of the metal waveguide 4 is connected to the aperture 5. In addition, it is preferable to arrange electromagnetic shielding plates B1, B2, B3 at the end face and the two side faces of the terminal end 3*a* of the dielectric strip 3 near the aperture 5, as shown in FIG. 1C, in order to reduce the connection loss due to leakage of high-frequency signals (also referred to as "signals" in the following) and to reduce the reflection of signals.

Figure 5:
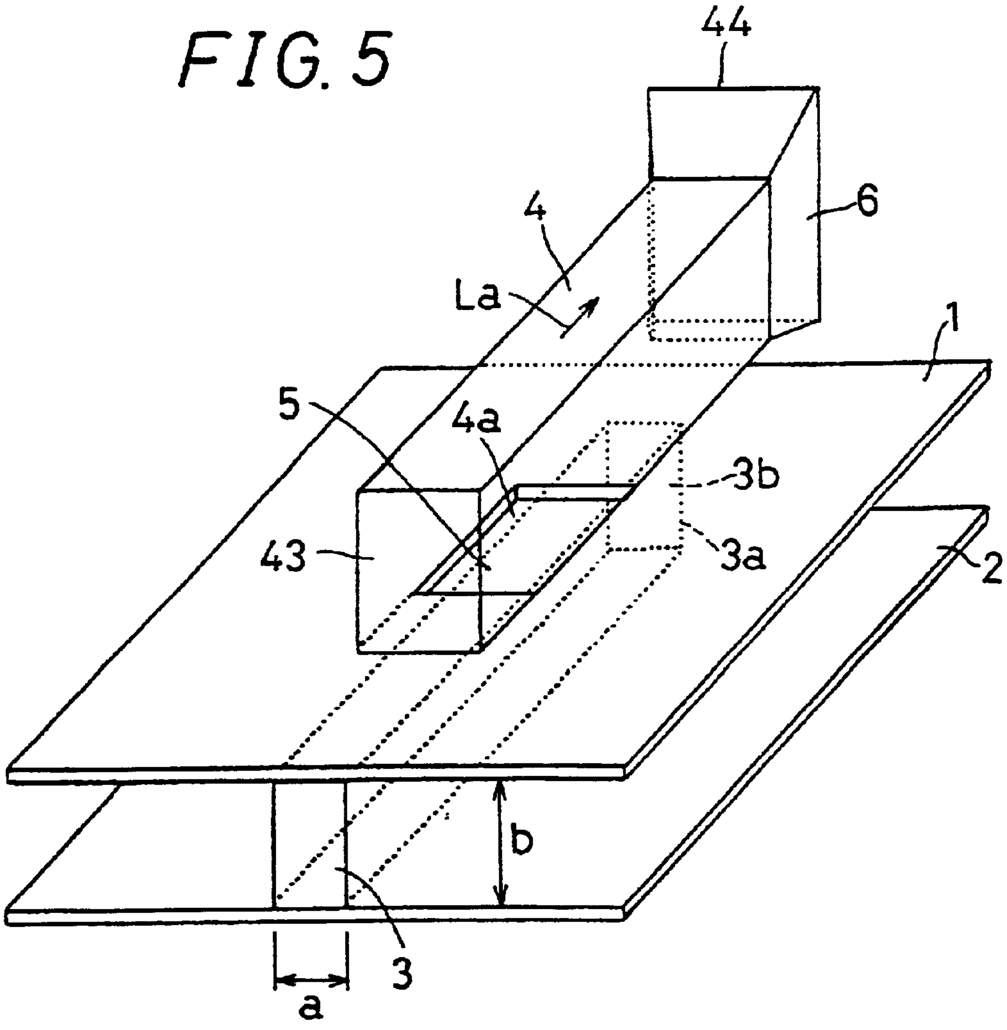
FIG. 5 is a perspective view showing another embodiment of the invention, in which a metal waveguide is connected to a dielectric strip in a direction parallel to a principal surface of the parallel planar conductors.

In an alternative configuration of the connection, the metal waveguide 4 is arranged such that the axis of the metal waveguide 4 (that is, the direction La) is parallel to the direction in which a high-frequency signal is propagated in the dielectric strip 3, as shown in FIG. 5. An aperture 4*a* is formed at a position that is removed from the closed terminal end 43 of the metal waveguide 4 by a length of n/2+¼ times the wavelength in the waveguide (wherein n is an integer of 0 or greater), and the apertures 4*a* and 5 are coupled to one another. That is to say, the aperture 4*a* and the aperture 5 have substantially the same square shape, and are connected by placing the edges of the apertures upon one another.

In the configuration in FIG. 5, it is preferable that the center of the aperture 4*a* is formed at a position at a distance of ¾ of the wavelength in the metal waveguide 4 from the end face of the closed terminal end of the metal waveguide 4. In that case, the connection is formed at the location that is closest to the closed terminal end 43 of the metal waveguide 4 while being formed at one of the locations where the electric field of the stationary wave generated by the wave reflected from the closed terminal end 43 of the metal waveguide 4 is largest, so that the connection loss can be minimized, and the direction in which the electromagnetic wave proceeds in the metal waveguide 4 is approximately the direction toward the open terminal end 44, which makes it possible to minimize the transmission loss as well.

The electromagnetic shielding members B1, B2, B3 and the conductive member of the invention should be made of an electrically conductive material, and to be specific, it is preferable that they are made of Cu, Al, Fe, Ni, Cr, Ti, Au, Ag, Pt, SUS (stainless steel), brass (Cu—Zn alloy), Fe—Ni alloy, Fe—Ni—Co alloy, an alloy including at least one of these metals as its principal component or the other alloys. These metals and alloys are favorable with regard to their high conductivity and workability. It is also possible to use members, in which a surface of an insulating substrate of plastic or ceramic or the like is covered (for example by plating) with a metallic material, or members, in which a surface of an insulating substrate of plastic or ceramic or the like is coated with a conductive resin including particles of a metallic material, for example.

The conductive member 3*b* can also be a conductive layer in which one of the above-mentioned metals is deposited by a film-forming method such as sputtering, vapor deposition, or CVD, or a conductive layer in which a coating of a conductive resin layer including particles of at least one of the above-mentioned metals has been applied.

The electromagnetic shielding members B1, B2, and B3 can be of various shapes, for example they can constitute plate shaped walls, they can be arranged as the rungs of a ladder in a ladder-shaped arrangement, or they can be arranged in form of a lattice, a mesh, or as a plurality of poles (columns). The distance between the rungs in a ladder-shaped arrangement, the distance between the bars in a lattice-shaped arrangement, the distance between the mesh elements in a mesh-shaped arrangement, and the distance between the poles in an arrangement of poles should be at most λ/4 each (wherein λ is the wavelength of the high-frequency signal) for electromagnetic shielding.

With regard to electromagnetic shielding, it is preferable that the height b1 of the electromagnetic shielding members B1, B2, B3 (see FIG. 1C) is the same as the distance b between the parallel planar conductors 1, 2, but the height of the electromagnetic shielding members B1, B2, B3 can also be slightly smaller than b. The length c of the electromagnetic shielding members B1, B2 should be such that the electromagnetic shielding members B1, B2 extend from the end face of the terminal end 3*a* of the dielectric strip 3 beyond the aperture 5, in which case leakage of the signals can be suppressed effectively.

It is preferable that the distances d1, d2 of the electromagnetic shielding members B1, B2 from the side faces of the dielectric strip 3 are λ/16 or more, respectively. When these distances d1 and d2 are less than λ/16, the impedance of the dielectric strip 3 in opposition to the electromagnetic shielding members B1, B2 changes, increasing the reflections of the signal propagating through the dielectric strip 3. Furthermore, it is preferable that the length d of the electromagnetic shielding member B3, which is equal to the sum of the d1, d2 and the width of the dielectric strip 3, is not larger than the width dx at which unwanted modes at the operating frequency are blocked. When the length d is larger than that width dx, it becomes difficult to suppress signal leakage effectively. For example, when the signal frequency is 77 GHz, and the dielectric constant of the dielectric strip 3 is 4.9 (cordierite ceramics), then dx is about 3.2 mm.

when a distance d3 is provided between the end face of the dielectric strip 3 and the electromagnetic shielding member B3, there is no particular limitation to that distance d3.

Figure 1B:
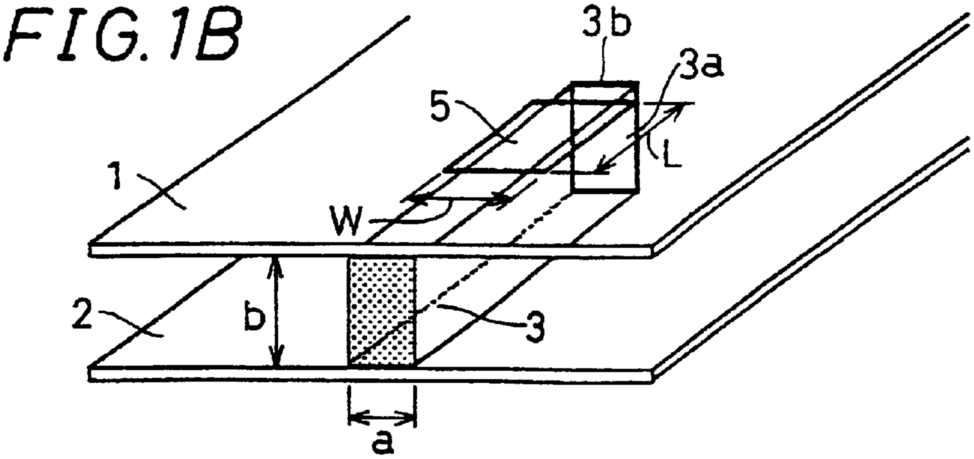
Figure 1C:
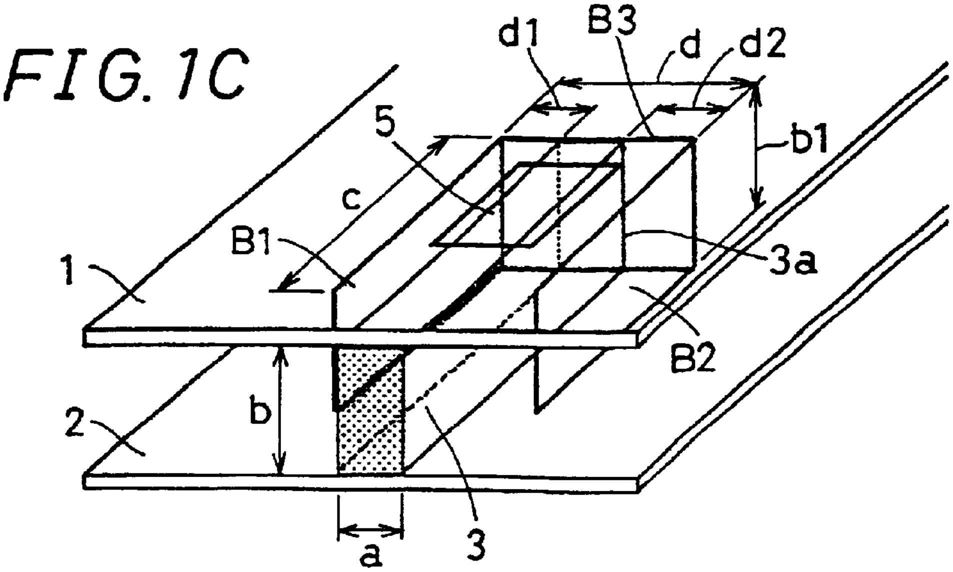

As for the shape and dimensions of the aperture 5 formed in the parallel planar conductor 1, it is preferable that the aperture 5 is rectangular, with a length L that is at most half of the wavelength in the dielectric strip 3 and a width W that is about the same as the width a of the dielectric strip 3, as shown in FIG. 1B. Such a rectangular aperture 5 is favorable with regard to low connection loss and good workability. There is no limitation to rectangular shapes, and the aperture 5 can also be circular or elliptical, for example.

For a millimeter wave transmitting/receiving module of the invention, it is preferable to form a horn antenna 6, in which the aperture of the open terminal end 42 on the other side of the metal waveguide 4 becomes gradually larger, as shown in FIG. 4. With this configuration, the open terminal end 42 on the other side of the metal waveguide 4 can be also used as an antenna, and the connection loss due to the connection portion with the antenna member can be made smaller in comparison with a case where a separate antenna member is used. By making it possible to transmit and receive high-frequency signals as radio waves, it is suitable, for example, as a millimeter wave radar system for an automobile with highly efficient transmission characteristics.

Figure 6:
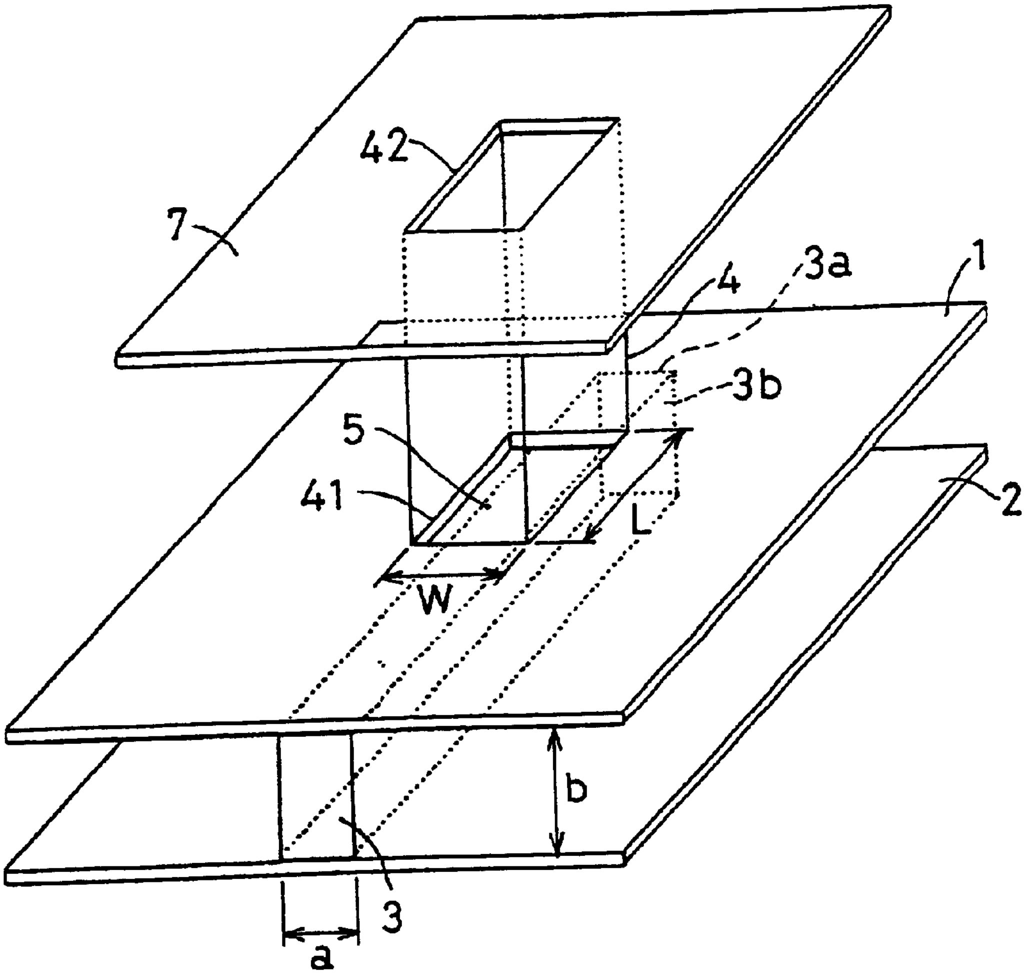
FIG. 6 is a perspective view showing yet another embodiment of the invention, in which a metal waveguide is connected to a dielectric strip in a direction perpendicular to a principal surface of the parallel planar conductors, the open terminal end of the metal waveguide on the other side being provided with a flat antenna.

It is also suitable to arrange an antenna member, such as a flat antenna 7, at the open terminal end 42 on the other side of the metal waveguide 4, as shown in FIG. 6. In that case, the connection loss of the antenna member becomes slightly larger than that of the antenna shown in FIG. 4, but arranging this antenna member at the open terminal end 42 on the other side of the metal waveguide 4 makes it possible to send and receive high-frequency signals as radio waves, so that it is suitable, for example, as a millimeter wave radar system for an automobile, with highly efficient transmission characteristics.

In the millimeter wave transmitting/receiving module of the invention, a horn antenna, a stacked aperture antenna, or a flat antenna 7 is suitable as the aperture antenna provided on the metal waveguide 4. Patch antennas, slot antennas and printed dipole antennas are examples of suitable flat antennas 7. In particular with regard to miniaturization of the millimeter wave integrated circuit in the millimeter band, a flat antenna 7 is preferable. In these categories, it is possible to use various kinds of antennas.

The metal waveguide 4 can be of a conductive material such as Cu, Al, Fe, Ag, Au, Pt, SUS (stainless steel), or brass (Cu—Zn alloy), or it can be made by forming a conductive layer of such a conductive material on a surface of an isolating material made of ceramics or resin, for example. These conductive materials are preferable with regard to their high electric conductivity and good workability.

In the NRD guide of the invention, preferable materials for the dielectric strip 3 include resinous dielectric materials, such as Teflon (trademark) and polystyrene, and ceramics, such as cordierite ($2MgO \cdot 2Al_2O_3 \cdot 5SiO_2$) ceramics, alumina ($Al_2O_3$) ceramics and glass ceramics, which are low loss in the high-frequency band.

In the invention, "high-frequency band" corresponds to the microwave and millimeter wave bands of several 10 GHz to several 100 GHz, such the high-frequency band of 30 GHz or more, more preferably 50 GHz or more and most preferably 70 GHz or more.

With regard to high electric conductivity and good workability, the parallel planar conductor 1 used in the NRD guide of the invention should be a conductive sheet made of, for example, Cu, Al, Fe, Ag, Au, Pt, SUS (stainless steel), or brass (Cu—Zn alloy), or it can be made by forming a conductive layer of such a conductive material on a surface of an isolating sheet made of ceramics or resin, for example.

Incorporating a high-frequency diode, such as a Gunn diode, as a high-frequency generation element, the NRD guide of the invention can be used for a wireless LAN or a millimeter wave radar for automobiles, for example. One possible application is to emit millimeter waves toward obstacles or other automobiles near the automobile, obtain an intermediate frequency signal formed with the reflected millimeter wave, and to measure the distance and the travel speed of the obstacle or the other automobile by analyzing this intermediate frequency signal.

In this manner, effects achieved by the invention are that the dielectric strip of an NRD guide can be connected with low connection loss to a metal waveguide, and that the NRD guide as well as the millimeter wave integrated circuit in which it is incorporated can be made smaller.

Figure 7:
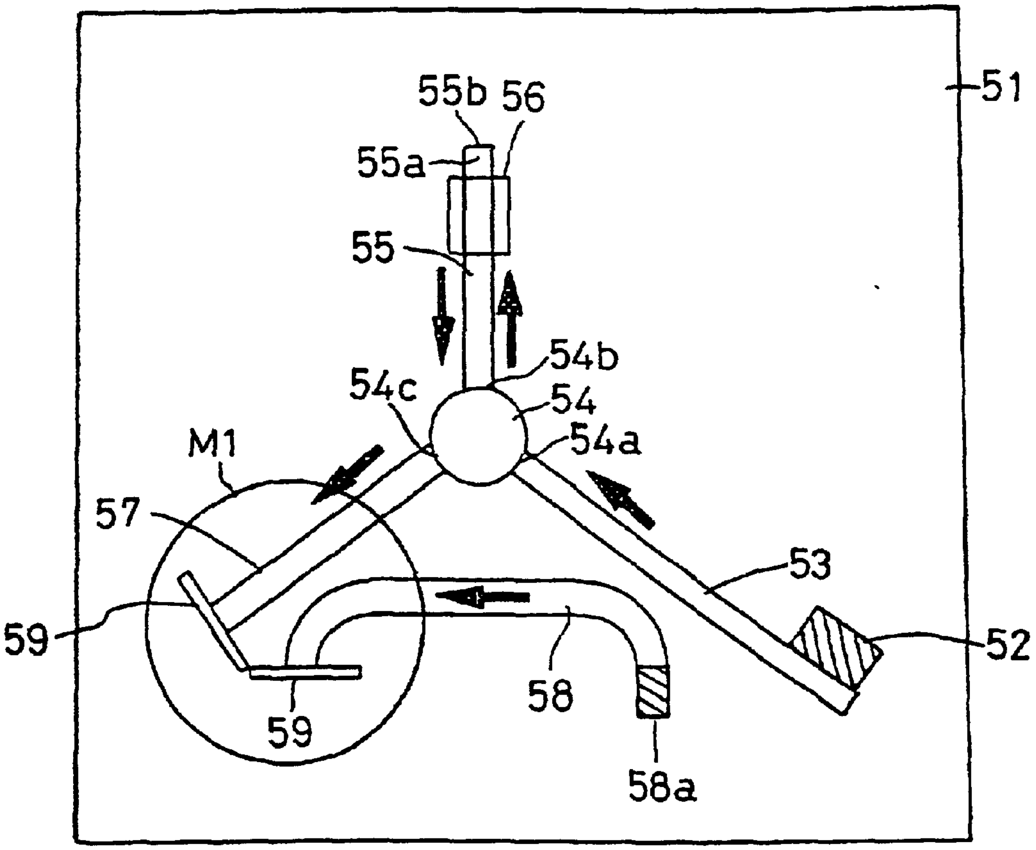
FIG. 7 is a plan view of an embodiment of a millimeter wave transmitter/receiver of the NRD guide type in accordance with the invention.
Figure 8:
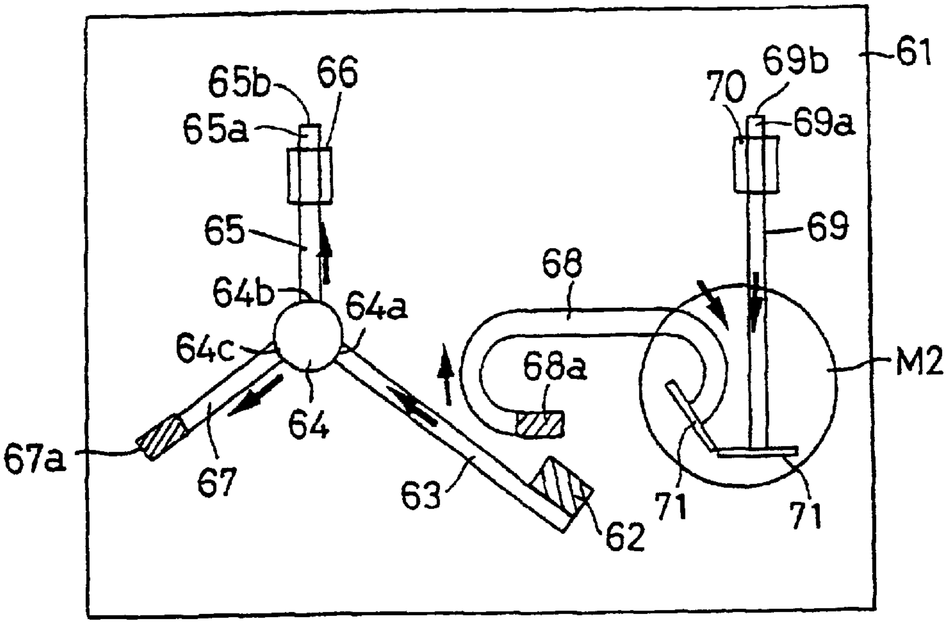
FIG. 8 is a plan view of another embodiment of a millimeter wave transmitter/receiver of the NRD guide type in accordance with the invention.
Figure 9:
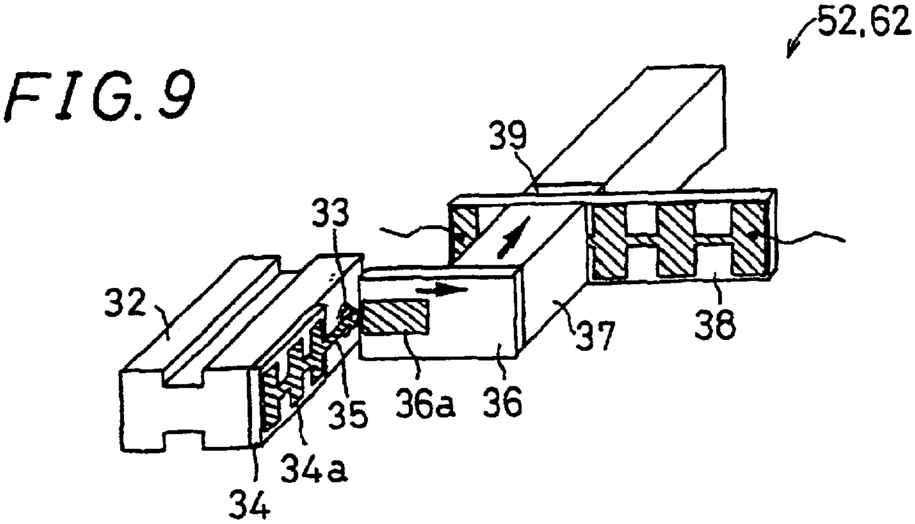
FIG. 9 is a perspective view of the millimeter wave signal oscillator for a millimeter wave transmitter/receiver in accordance with the invention.
Figure 10:
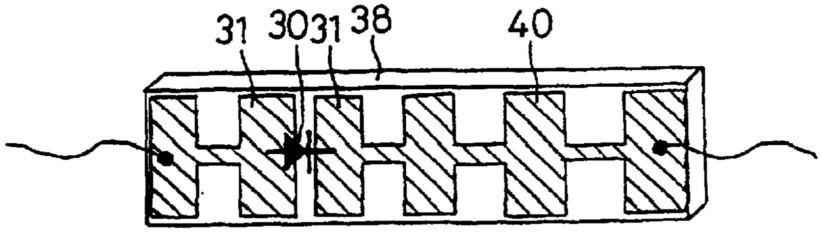
FIG. 10 is a perspective view of a printed circuit board provided with a variable capacitance diode for a millimeter wave oscillator in accordance with the invention.

The following describes a millimeter wave transmitter/receiver in accordance with the invention. FIGS. 7 to 10 show such a millimeter wave transmitter/receiver in accordance with the invention. FIG. 7 is a plan view of a system, in which a receiving antenna and a transmitting antenna are integrated. FIG. 8 is a plan view of a system, in which a receiving antenna and a transmitting antenna are formed independently. FIG. 9 is a perspective view of a millimeter wave signal oscillator. FIG. 10 is a perspective view of a printed circuit board provided with a variable capacitance diode (varactor diode) for a millimeter wave signal oscillator.

The milimeter wave transmitter/receiver comprises parallel planar conductors; a voltage-controlled milimeter wave signal oscillator 52; a first dielectric strip 53; a circulator 54; a third dielectric strip 55; a transmitter/receiver antenna 56; a fourth dielectric strip 57; a second dielectric strip 58; and a mixer 59. In FIG. 7, only one of the parallel planar conductors 51 of the invention is shown, but the other one has been omitted from the drawings. The voltage-controlled millimeter wave signal oscillator 52 is provided at one end of the first dielectric strip 53. The millimeter wave signal oscillator 52 is provided with a high-frequency diode, such as a Gunn diode, serving as a high-frequency generation element, and a variable capacitance diode. The variable capacitance diode is arranged in the first dielectric strip 53 near the high-frequency diode, such that the direction of the bias voltage application coincides with the direction of the electric field of the millimeter wave signal, and millimeter wave signals are emitted from the high-frequency diode in form of triangular or sine-shaped frequency modulated transmission millimeter waves by controlling the bias voltage applied between the input and output electrodes of this variable capacitance diode.

The first dielectric strip 53 propagates millimeter wave signals obtained by modulating high-frequency signals output by the high-frequency diode. The circulator 54 is made for example of a ferrite disk and includes first, second and third connection portions 54*a*, 54*b*, 54*c* that are respectively connected to the first, third and fourth dielectric strips 53, 55, 57. The third dielectric strip 55 propagates the millimeter wave signals and is connected to the second connection portion 54*b* of the circulator 54 and includes the transmitter/receiver antenna 56 at its front end. In the embodiment, the third dielectric strip 55 corresponds to the dielectric strip 3 of FIG. 1A. The transmitter/receiver antenna 56 is connected to the third dielectric strip 55 via a metal waveguide.

The circulator 54 includes a first connection portion 54*a*, a second connection portion 54*b* and a third connection portion 54*c* serving as input/output terminals for millimeter wave signals and arranged at predetermined spacings along the perimeter of the ferrite disk, which is arranged in parallel to the parallel planar conductors. The millimeter wave signals input into one connection portion are output from the connection portion that is adjacent in clockwise or anticlockwise circulation within the plane of the ferrite disk.

The fourth dielectric strip 57 propagates received waves that have been received with the receiving antenna 56, propagated along the third dielectric strip 55, and output by the third connection portion 54*c* of the circulator 54, toward the mixer 59. One end of the second dielectric strip 58 is arranged near the first dielectric strip 53 of electromagnetic coupling, or one end of the second dielectric strip 58 is joined to the first dielectric strip 53, and a portion of the millimeter wave signal is propagated toward the mixer 59. A non-reflective terminal end 58*a* (terminator) of the second dielectric strip 58 is arranged at the end of the second dielectric strip 58 that is away from the mixer 59. In FIG. 7, a mixer portion M1 generates an intermediate frequency signal by mixing a portion of the millimeter wave signal and the received wave. in the mixer portion M1, an intermediate portion of the second dielectric strip 58 and an intermediate portion of the fourth dielectric strip 57 are placed near each other and electromagnetically coupled or they are joined together.

To join the first dielectric strip 53 and the second dielectric strip 58 of the invention together, it is preferable to make the joint portion of either one of the dielectric strips 53, 58 arc-shaped, and to make the curvature radius r of the arc-shaped portion equal or greater than the wavelength λ of the high-frequency signal. Thus, it is possible to branch the high-frequency signal with low loss and uniform output. If the second dielectric strip 58 and the fourth dielectric strip 57 are joined together, the joint portion of either one of the dielectric strips 53 and 58 should be arc-shaped, as described above, and the curvature radius r of the arc-shaped portion should be equal or greater than the wavelength λ of the high-frequency signal.

These various components are arranged between the parallel planar conductors, which are spaced at not more than half the wavelength of the millimeter wave signal. An aperture is formed in at least one of the parallel planar conductors at the location where the electric field of the stationary wave generated at the terminal end of the shorted third dielectric strip 55 is largest, and a transmitter/receiver antenna 56 is provided, with a metal waveguide being arranged between this aperture and the transmitter/receiver antenna 56. The configuration of the metal waveguide and the transmitter/receiver antenna 56, the structure for connecting the metal waveguide and the third dielectric strip 55, and the details regarding configuration, materials, and electromagnetic shielding members of the dielectric strips can be as described above. That is to say, a conductive member 55*b* made of a conductive plate or a conductive layer having substantially the same as an end face of a terminal end 55*a* of the third dielectric strip 55 is placed at the end face of the terminal end 55*a*.

In the millimeter wave transmitter/receiver in FIG. 7, it is also possible to provide a switch in form of a modulator with the configuration shown in FIG. 10 at an intermediate portion of the first dielectric strip 53, to modulate the millimeter wave signals. For example, such a switch can be made by forming a second choke-type bias supplying strip 40 on a principal surface of a printed circuit board 38, and providing a PIN diode or a Schottky barrier diode arranged at an intermediate position on the printed circuit board 38, as shown in FIG. 10. The printed circuit board 38 is placed in the first dielectric strip 53 (in FIG. 9, a dielectric strip 37), between the circulator 54 and the signal branching portion of the first dielectric strip 53 and the second dielectric strip 58, such that the direction of the electric field of the high-frequency signal coincides with the direction in which a bias voltage is applied to the input/output electrode of the amplitude modulation diode, that is, the PIN diode or the Schottky barrier diode.

A switch can also be made by providing a second circulator in the first dielectric strip 53, connecting the first dielectric strip 53 to the first and third connection portions of this circulator, connecting another dielectric strip to its second connection portion, and providing the Schottky barrier diode as shown in FIG. 10 at the end face of the front end portion of this dielectric strip.

As another embodiment of a millimeter wave transmitter/receiver in accordance with the invention, there is the type shown in FIG. 8, in which the transmitting antenna and the receiving antenna are independent. The milimeter wave transmitter/receiver comprises parallel planar conductors; a voltage-controlled wave signal oscillator 62; a first dielectric strip 63; a circulator 64; a third dielectric strip 65; a transmitting antenna 66; a fifth dielectric strip 67; a second dielectric strip 68; a fourth dielectric strip 69; a receiving antenna 70; and a mixer 71. In FIG. 8, only one of the parallel planar conductors 61 of the invention is shown, but the other one has been omitted from the drawings. The voltage-controlled millimeter wave signal oscillator 62 is provided at one end of a first dielectric strip 63. This millimeter wave signal oscillator 62 includes a high-frequency diode, such as a Gunn diode, and a variable capacitance diode. The variable capacitance diode is arranged in the first dielectric strip 63 near the high-frequency diode, such that the bias voltage application direction coincides with the electric field direction of the millimeter wave signal. Millimeter wave signals are emitted from the high-frequency diode in form of triangular or sine-shaped frequency modulated transmission millimeter waves by controlling the bias voltage applied between the input and output electrodes of this variable capacitance diode.

The first dielectric strip 63 propagates millimeter wave signals obtained by modulating high-frequency signals output by the high-frequency diode. The circulator 64 is made for example of a ferrite disk and including first, second and third connection portions 64*a*, 64*b*, 64*c* that are respectively connected to the first, third and fifth dielectric strip 63, 65, 67. The third dielectric strip 65 propagates millimeter wave signals and is connected to the second connection portion 64*b* of the circulator 64 and includes the transmitting antenna 66 at its front end. The transmitting antenna 66 is connected to the third dielectric strip 65 via a metal waveguide. The fifth dielectric strip 67 is connected to the third connection portion 64*c* of the circulator 64 and is provided at its front end with a non-reflective terminal end 67*a* for attenuating the millimeter wave signals for transmission.

One end of the second dielectric strip 68 is arranged near the first dielectric strip 63 for electromagnetic coupling, or one end of the second dielectric strip 68 is joined to the first dielectric strip 63, and a portion of the millimeter wave signal is propagated toward the mixer 71. A non-reflective terminal end 68*a* of the second dielectric strip 68 is arranged at the end of the second dielectric strip 68 that is away from the mixer 71. The fourth dielectric strip 69 propagates waves that have been received with the receiving antenna 70 toward the mixer 71. In FIG. 8, a mixer portion M2 generates an intermediate frequency signal by mixing a portion of the millimeter wave signal and the received wave. In the mixer portion M2, an intermediate portion of the second dielectric strip 68 and an intermediate portion of the fourth dielectric strip 69 are placed near each other and electromagnetically coupled or they are joined together.

To join the first dielectric strip 63 and the second dielectric strip 68 of the invention together, it is possible to make the joint portion of either one of the dielectric strips 63 and 68 arc-shaped, and to make the curvature radius r of the arc-shaped portion equal or greater than the wavelength $\lambda$ of the high-frequency signal. Thus, it is possible to branch the high-frequency signal with low loss and uniform output. If the second dielectric strip 68 and the fourth dielectric strip 69 are joined together, the joint portion of either one of the dielectric strips 68 and 69 should be arc-shaped, as described above, and the curvature radius r of the arc-shaped portion should be equal or greater than the wavelength $\lambda$ of the high-frequency signal.

In the embodiment, each of the third and fourth dielectric strips 65, 69 corresponds to the dielectric strip 3 of FIG. 1A.

These various components are arranged between the parallel planar conductors, which are spaced apart at not more than half the wavelength of the millimeter wave signal. Apertures are formed in at least one of the parallel planar conductors at the location where the electric fields of the stationary waves of the $LSM_{01}$ mode generated by the waves reflected from the shorted terminal ends of the third dielectric strip 65 and the fourth dielectric strip 69 are largest. On these apertures, metal waveguides are provided, one end of the metal waveguides being provided with a transmitting antenna 66 and a receiving antenna 70, respectively, and open terminal ends on the other, open terminal end of the metal waveguides being connected with the apertures. The configuration of the metal waveguides and the receiving and transmitting antennas, the structure for connecting the metal waveguides with the third dielectric strip 65 and the fourth dielectric strip 69, and the details regarding configuration, materials, and electromagnetic shielding members of the dielectric strips can be as described above.

It is also possible to eliminate the circulator 64 in the millimeter wave transmitter/receiver in FIG. 8, and to connect the transmitting antenna 66 to the front end of the first dielectric strip 63. In that case, the system can be made smaller, but a portion of the received wave is fed into the millimeter wave signal oscillator 62, which tends to cause noise, so that the configuration shown in FIG. 8 is preferable. That is to say, each of conductive members 65*b*, 69*b* made of a conductive plate or a conductive layer having substantially the same as end face of each of terminal ends 65*a*, 69*a* of the third and fourth dielectric strips 65, 69 is placed at the end face of each of the terminal ends 65*a*, 69*a*.

A switch with the configuration shown in FIG. 10 can be provided at an intermediate portion of the first dielectric strip 63 in the millimeter wave transmitter/receiver in FIG. 8, and the millimeter wave signal can be amplitude modulated by controlling this switch with an amplitude modulation signal. For example, the switch can be made by forming a second choke-type bias supplying strip 40 on a principal surface of the printed circuit board 38 as shown in FIG. 10, and provide a beam lead PIN diode or a Schottky barrier diode at an intermediate position thereof. The printed circuit board 38 is placed in the first dielectric strip 63 (in FIG. 9, the dielectric strip 37), between the circulator 64 and the signal branching portion of the first dielectric strip 63 and the second dielectric strip 68, such that the direction of the electric field of the high-frequency signal coincides with the direction in which a bias voltage is applied to the input and output electrodes of an amplitude modulation diode, that is, the PIN diode or the Schottky barrier diode.

A switch can also be made by providing a second circulator in the first dielectric strip 63, connecting the first dielectric strip 63 to the first and third connection portions of this circulator, connecting another dielectric strip to its second connection portion, and providing a Schottky barrier diode as shown in FIG. 10 at the end face of the front end portion of this dielectric strip.

In the configuration shown in FIG. 8, it is also possible to arrange one end of the second dielectric strip 68 near the third dielectric strip 65 for electromagnetic coupling, or to join one end of the second dielectric strip 68 to the third dielectric strip 65, so that a portion of the millimeter wave signal is propagated toward the mixer 71.

Furthermore, in these millimeter wave transmitter/receivers, the distance between the parallel planar conductors is approximately the same as the wavelength of the millimeter wave signal in air, so that it is not more than half the wavelength at the usage frequency.

The millimeter wave signal generators 52, 62 for the millimeter wave transmitter/receivers of FIGS. 7 and 8 are shown in FIGS. 9 and 10. In these drawings, a metal member 32, such as a metal block, is for placing a Gunn diode 33, and the Gunn diode 33 is one type of high-frequency diodes for generating millimeter waves. A printed circuit board 34 is disposed on one surface of the metal member 32, and on the printed circuit board 34, a choke-type bias supplying strip 34*a* which supplies a bias voltage to the Gunn diode 33 and functions as a lowpass filter for preventing leakage of high-frequency signals, is formed. A band-shaped conductor 35, such as a metal foil ribbon, connects the choke-type bias supplying strip 34*a* and the upper conductor of the Gunn diode 33. A metal strip resonator 36 is provided with a metal strip waveguide 36*a* for resonance on a dielectric substrate. A dielectric strip 37 guides the high-frequency signal generated with the metal strip resonator 36 out of the millimeter wave signal oscillator.

A printed circuit board 38 with a varactor diode 30, which is a diode for frequency modulation and one type of a variable capacitance diode, is provided at an intermediate position of the dielectric strip 37. The input and output electrodes of this varactor diode 30 are arranged in a direction (electric field direction) that is perpendicular to the direction in which the high-frequency signal is propagated along the dielectric strip 37 and parallel to the principle face of the parallel planar conductors. The direction in which a bias voltage is applied to the input and output electrodes of the varactor diode 30 coincides with the electric field direction of the $LSM_{01}$-mode high-frequency signal propagating through the dielectric strip 37, whereby the high-frequency signal is electromagnetically coupled with the varactor diode 30, and the capacitance of the varactor diode 30 can be changed by controlling the bias voltage, thus controlling the frequency of the high-frequency signal. A dielectric plate 39 with a high dielectric constant matches the impedance of the varactor diode 30 and the dielectric strip 37.

As shown in FIG. 10, the second choke-type bias supplying strip 40 is formed on a principal surface of the printed circuit board 38, and a beam lead varactor diode 30 is placed at an intermediate of the second choke-type bias supplying strip 40. A connection electrode 31 is formed at the portion of the second choke-type bias supplying strip 40 that is connected to the varactor diode 30.

The high-frequency signal generated with the Gunn diode 33 is guided through the metal strip resonator 36 into the dielectric strip 37. Then, a portion of the high-frequency signal is reflected by the varactor diode 30, back toward the Gunn diode 33. This reflected signal changes together with the capacitance of the varactor diode 30, and the oscillation frequency changes.

The millimeter wave transmitter/receiver of FIGS. 7 and 8 is of the frequency modulation continuous wave type, whose operating principle is as follows. An input signal with, for example, a triangular voltage amplitude is fed into a MODIN terminal for modulation signal input of a millimeter wave signal oscillator, and the output signal is frequency modulated, producing a triangular sweep of the output frequency of the millimeter wave signal oscillator, for example. Then, when the output signal (transmitted wave) is emitted from the transmitter/receiver antenna 56 or the transmitting antenna 66, and there is a target in front of the transmitter/receiver antenna 56 or the transmitting antenna 66, a reflected wave (received wave) is returned at a time difference corresponding to the round trip length for the propagation speed of the radio wave. The IFOUT terminal on the output side of the mixer 59, 71 then outputs the frequency difference of the transmitted wave and the received wave.

By analyzing the frequency components of the output frequency of the IFOUT terminal, it is possible to derive the distance from the equation $Fif=4R\cdot fm\cdot \Delta f/c$ (with Fif: IF (intermediate frequency) output frequency; R: distance; fm: modulation frequency; Δf: frequency deviation; c: speed of light.)

In the millimeter wave signal oscillator of the invention, it is preferable that the choke-type bias supplying strip **34*a* and the band-shaped conductor 35** are made of Cu, Al, Au, Ag, W, Ti, Ni, Cr, Pd, Pt or the like, and Cu and Ag are especially preferable with regard to their high electrical conductivity, and with regard to attaining low loss and high oscillation output.

Furthermore, the band-shaped conductor 35 is electromagnetically coupled with metal member 32, leaving a predetermined distance to the surface of the metal member 32 and straddling the distance between choke-type bias supplying strip **34*a* and the Gunn diode 33. That is to say, one end of the band-shaped conductor 35 is connected, for example by soldering, to one end of the choke-type bias supplying strip 34*a*, and the other end of the band-shaped conductor 35 is connected, for example by soldering, to the upper conductor of the Gunn diode 33, so that the intermediate portion of the band-shaped conductor 35**, apart from its connection portions, is arranged free in a suspended fashion.

Any metal member that can serve as electrical ground for the Gunn diode 33 can be used for the metal member 32, and while there is no particular limitation to the material for the metal member 32, other than being made of metal (including alloys), it can be made of brass (Cu—Zn alloy), Al, Cu, SUS (stainless steel), Ag, Au, Pt, or the like. The metal member 32 can also be a metal block made entirely of metal, or an insulating substrate of ceramics or plastic or the like, that is entirely or partially plated with metal, or an insulating substrate that is entirely or partially coated with a conductive resin material.

Thus, the millimeter wave transmitter/receiver of the invention, which has excellent millimeter wave signal transmission characteristics, can increase the detection distance of a millimeter wave radar (see millimeter wave transmitter/receiver in FIG. 7), and the millimeter wave signals for transmission are not fed through a circulator into a mixer, so that as a result, the noise of the received signal is reduced, and the detection distance can be increased (see millimeter wave transmitter/receiver in FIG. 8), and having excellent millimeter wave signal transmission characteristics, the detection distance of the millimeter wave radar can be increased even further.

The following is a detailed description of another NRD guides in accordance with the invention. FIGS. 11A, 11B, 12, 13 and 14 are perspective views of another NRD guides in accordance with the invention. As shown in these drawings, an NRD guide in accordance with the invention includes a dielectric strip 103 with a rectangular cross section a×b arranged between a pair of parallel planar conductors 101, 102, the dielectric strip 103 being provided with a terminal end **103*a*, which is not closed and shorted but open with respect to high-frequency signals. In the NRD guide with such a configuration, the stationary wave of the electric field due to the LSM mode is generated by the wave reflected from the end face of the terminal end 103*a*, as shown in FIG. 3**.

Figure 11A:
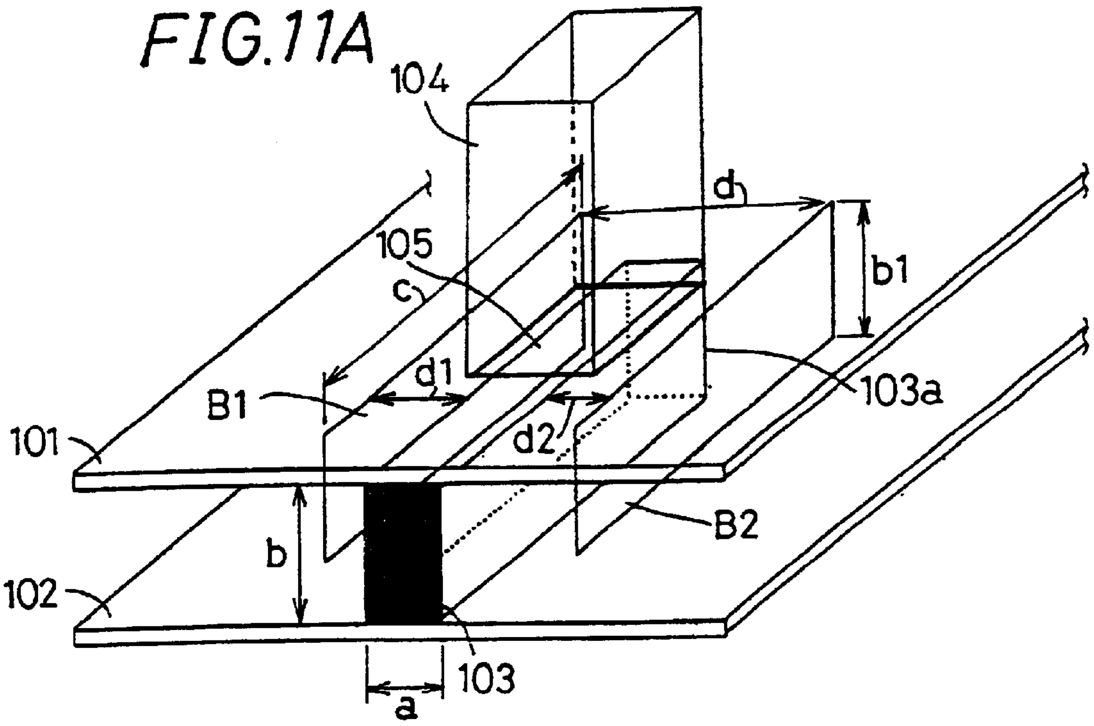
FIGS. 11A and 11B show another structure for connecting an NRD guide and a metal waveguide in accordance with the invention.
Figure 11B:
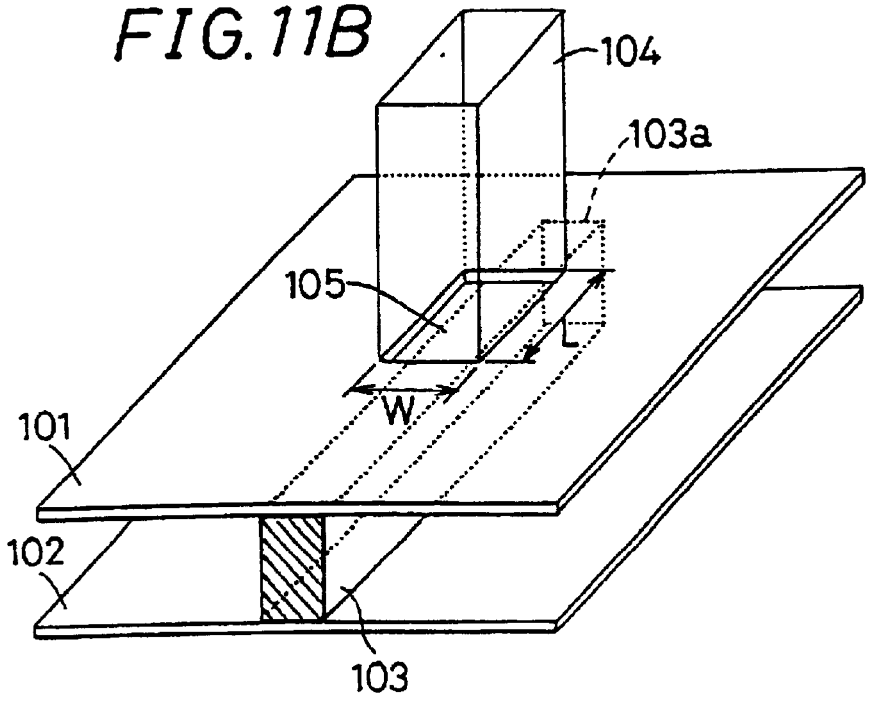

In the invention, an aperture 105 is provided at a portion where the electric field of this stationary wave is strong, that is, at any of the locations E1, E2, E3, E4 of the parallel planar conductor 101 in FIG. 3, to connect the dielectric strip 103 to the metal waveguide 104 as shown in FIG. 11B, the aperture 105 having one of the locations E1, E2, E3, E4 at its center. E1 (m=0 in the following) is located closest to the terminal end **103*a* of the dielectric strip 103, and E2 (m=1), E3 (m=2) and E4 (m=3) are located at the positions that are removed from the terminal end 103*a* by a length of m/2 times the wavelength in metal waveguide (wherein m is an integer of zero or greater) With regard to keeping losses low, it is preferable that the place where the dielectric strip 103 is connected to the metal waveguide 104 is at an aperture 105** at E2, E3 or E4. Furthermore, with regard to keeping losses low and achieving miniaturization, it is even more preferable that it is at E2.

Figure 12:
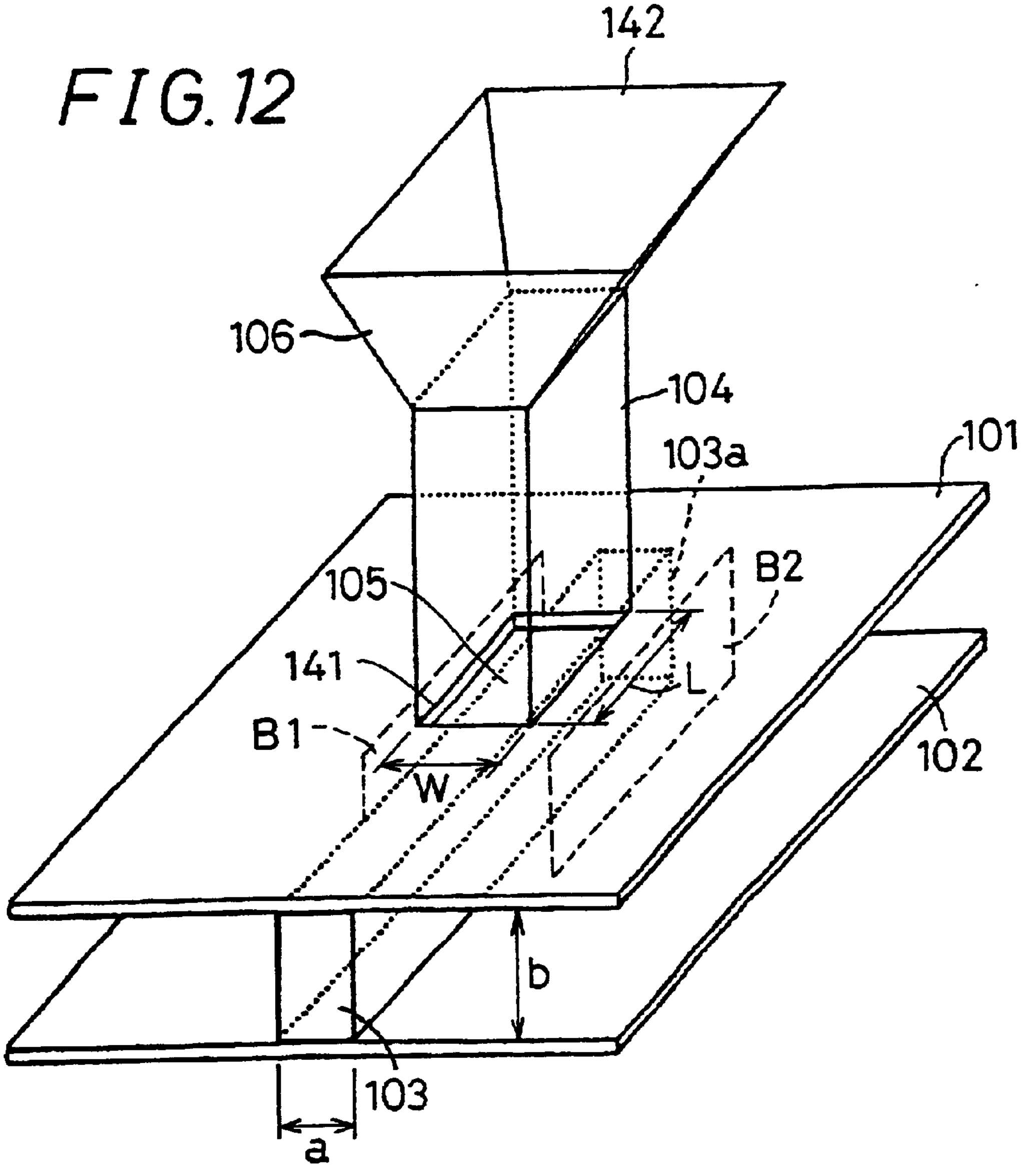
FIG. 12 is a perspective view showing yet another embodiment of the invention, in which a metal waveguide is connected to a dielectric strip in a direction perpendicular to a principal surface of the parallel planar conductors, the open terminal end of the metal waveguide on the other side being provided with a horn antenna.

The dielectric strip 103 of the NRD guide and the metal waveguide 104 are connected by the aperture 105 provided in the parallel planar conductor 101. The connection is configured such that the direction of the electric fields in the dielectric strip 103 and the metal waveguide 104 coincide with one another. That is to say, as shown in FIG. 12, an open terminal end 141 of the metal waveguide 104 is connected to the aperture 105. In addition, electromagnetic shielding members B1, B2 are arranged along the two side faces of the terminal end 103*a* of the dielectric strip 103 near the aperture 105, as shown in FIG. 11A, in order to reduce the connection loss due to leakage of high-frequency signals and to reduce the reflection of signals. Preferably, an electromagnetic shielding member B3 is provided at a certain distance behind the end face of the terminal end 103*a*, to prevent the leakage of high-frequency signals toward the end face of the terminal end 103*a*.

Figure 13:
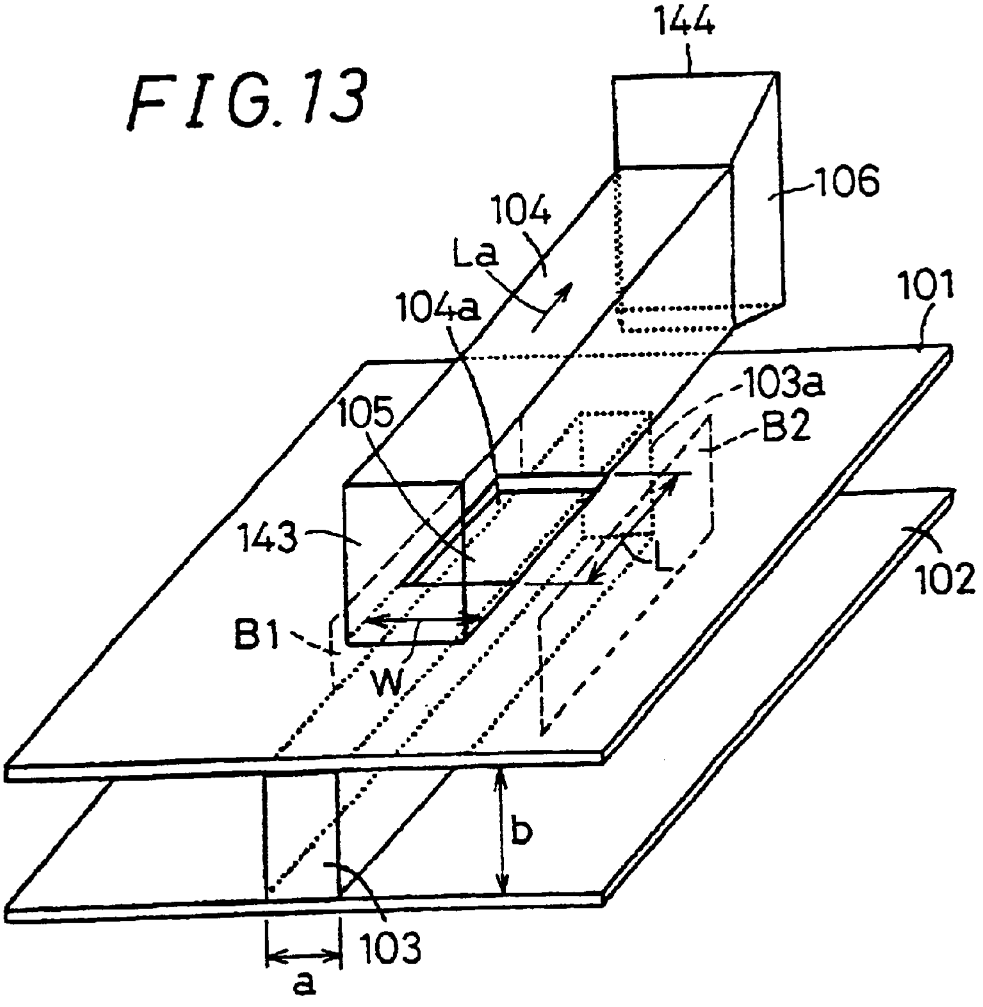
FIG. 13 is a perspective view showing yet another embodiment of the invention, in which a metal waveguide is connected to a dielectric strip in a direction parallel to a principal surface of the parallel planar conductors.

In an alternative configuration of the connection, the metal waveguide 104 is arranged such that the axis of the metal waveguide 104 (that is, the direction La) is parallel to the direction in which a high-frequency signal is propagated in the dielectric strip 103, as shown in FIG. 13. An aperture 104*a* is formed at a position that is removed from the closed terminal end 143 of the metal waveguide 104 by a length of n/2+¼ times the wavelength in the waveguide (wherein n is an integer of 0 or greater), and the apertures 104*a* and 105 are coupled to one another. That is to say, the aperture 104*a* and the aperture 105 have substantially the same square shape, and are connected by placing the edges of the apertures upon one another.

In the configuration in FIG. 13, which is similar to that as shown in FIG. 5, it is preferable that the center of the aperture 104*a* is formed at a position at a distance of ¾ of the wavelength in the metal waveguide 104 from the end face of the closed terminal end 143 of the metal waveguide 104. In this case, it is also possible to obtain the same effect as that in the configuration of FIG. 5. At a position that is ¼ of the wavelength in the metal waveguide 104 from the end face of the terminal end 143, the electromagnetic field tends to be unstable due to the vicinity to the end face of the terminal end 143, and consequently, it is preferable that the center of the aperture 104*a* is arranged at a position that is ¾ of the wavelength in the metal waveguide 104 from the distance of the end face of the terminal end 143, because then the electromagnetic field distribution is more stable.

The material, shape and forming method of the electromagnetic shielding members B1, B2, and B3 is the same as those of the above-mentioned embodiment and accordingly the explanation thereof is omitted.

With regard to electromagnetic shielding, it is preferable that the height b1 of the electromagnetic shielding members B1, B2, B3 (see FIG. 11A) is the same as the distance b between the parallel planar conductors 101, 102, but the height b1 of the electromagnetic shielding members B1, B2, B3 can also be slightly smaller than b. The length c of the electromagnetic shielding members B1, B2 should be such that the electromagnetic shielding members B1, B2 extend from the end face of the terminal end 103*a* of the dielectric strip 103 beyond the aperture 105, in which case leakage of the signals can be suppressed effectively.

It is preferable that the distances d1, d2 of the electromagnetic shielding members B1, B2 from the side faces of the dielectric strip 103 are λ/16 or more, respectively. When these distances d1, d2 are less than λ/16, the impedance of the dielectric strip 103 in opposition to the electromagnetic shielding members B1, B2 changes, increasing the reflections of the signal propagating through the dielectric strip 103. Furthermore, it is preferable that the length d of the electromagnetic shielding member B3, which is equal to the sum of the d1, d2 and the width of the dielectric strip 103, is not larger than the width dx at which unwanted modes at the operating frequency are blocked. When the length d is larger than that width dx, it becomes difficult to suppress signal leakage effectively. For example, when the signal frequency is 77 GHz, and the dielectric constant of the dielectric strip 103 is 4.9 (cordierite ceramics), then dx is about 3.2 mm.

When a distance d3 is provided between the end face of the dielectric strip 103 and the electromagnetic shielding member B3, there is no particular limitation to that distance d3.

As for the shape and dimensions of the aperture 105 formed in the parallel planar conductor 101, it is preferable that the aperture 105 is rectangular, with a length L that is at most half of the wavelength in the dielectric strip 103 and a width W that is about the same as the width a of the dielectric strip 103, as shown in FIG. 11B. Such a rectangular aperture 105 is favorable with regard to low connection loss and good workability. There is no limitation to rectangular shapes, and the aperture 105 can also be circular or elliptical, for example.

For the invention, as shown in FIG. 12, it is preferable to form a horn antenna 106, in which the aperture of the open terminal end 144 on the other side of the metal waveguide 104 becomes gradually larger, as is the case in FIG. 4. In this configuration it is possible to obtain the same effect as in the configuration of FIG. 4. By making it possible to transmit and receive high-frequency signals as radiowaves, it is suitable, for example, as a millimeter wave radar system for an automobile with highly efficient transmission characteristics.

Figure 14:
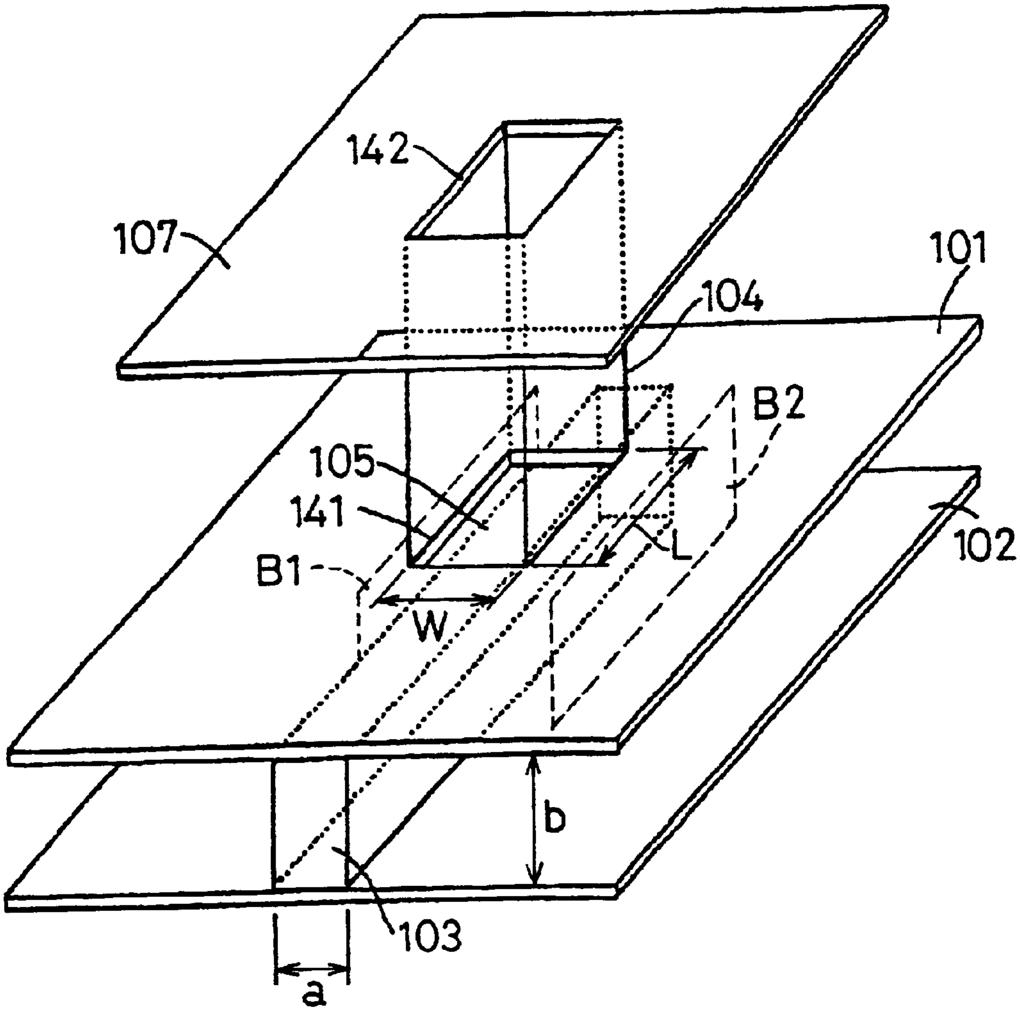
FIG. 14 is a perspective view showing yet another embodiment of the invention, in which a metal waveguide is connected to a dielectric strip in a direction perpendicular to a principal surface of the parallel planar conductors, the open terminal end of the metal waveguide on the other side being provided with a flat antenna.

It is also suitable to arrange an antenna member, such as a flat antenna 107, at the open terminal end 142 on the other side of the metal waveguide 104, as shown in FIG. 14. In that case, as is the case in FIG. 6, the connection loss of the antenna member becomes slightly larger than that of the antenna shown in FIG. 13, but arranging this antenna member at the open terminal end 142 on the other side of the metal waveguide 104 makes it possible to send and receive high-frequency signals as radio waves, so that it is suitable, for example, as a millimeter wave radar system for an automobile, with highly efficient transmission characteristics.

In the invention, a horn antenna, a stacked aperture antenna, or a flat antenna is suitable as the aperture antenna provided on the metal waveguide 104. Patch antennas, slot antennas and printed dipole antennas are examples of suitable flat antennas. In particular with regard to miniaturization of the millimeter wave integrated circuit in the millimeter band, a flat antenna is preferable. In these categories, it is possible to use various kinds of antennas.

The material of the metal waveguide 104 is the same as that of the metal waveguide 4 of the above-mentioned embodiment.

In the NRD guide of the invention the material of the dielectric strip 103 is the same as that of the dielectric strip 3 of the above-mentioned embodiment of the invention.

In the invention, "high-frequency band" corresponds to the microwave and millimeter wave bands of several 10 GHz to several 100 GHz, such the high-frequency band of 30 GHz or more, more preferably 50 GHz or more and most preferably 70 GHz or more.

The material of the parallel planar conductor 101 used in the NRD guide of the invention is the same as that of the parallel planar conductor of the above-mentioned embodiment of the invention.

Incorporating a high-frequency diode, such as a Gunn diode, as a high-frequency generation element, the NRD guide of the invention can be used for a wireless LAN or a millimeter wave radar for automobiles, for example. One possible application is to emit millimeter waves toward obstacles or other automobiles near the automobile, obtain an intermediate frequency signal formed with the reflected millimeter wave, and to measure the distance and the travel speed of the obstacle or the other automobile by analyzing this intermediate frequency signal.

In this manner, effects achieved by the invention are that the dielectric strip of an NRD guide can be connected with low connection loss to a metal waveguide, and that the NRD guide as well as the millimeter wave integrated circuit in which it is incorporated can be made smaller.

Figure 15:
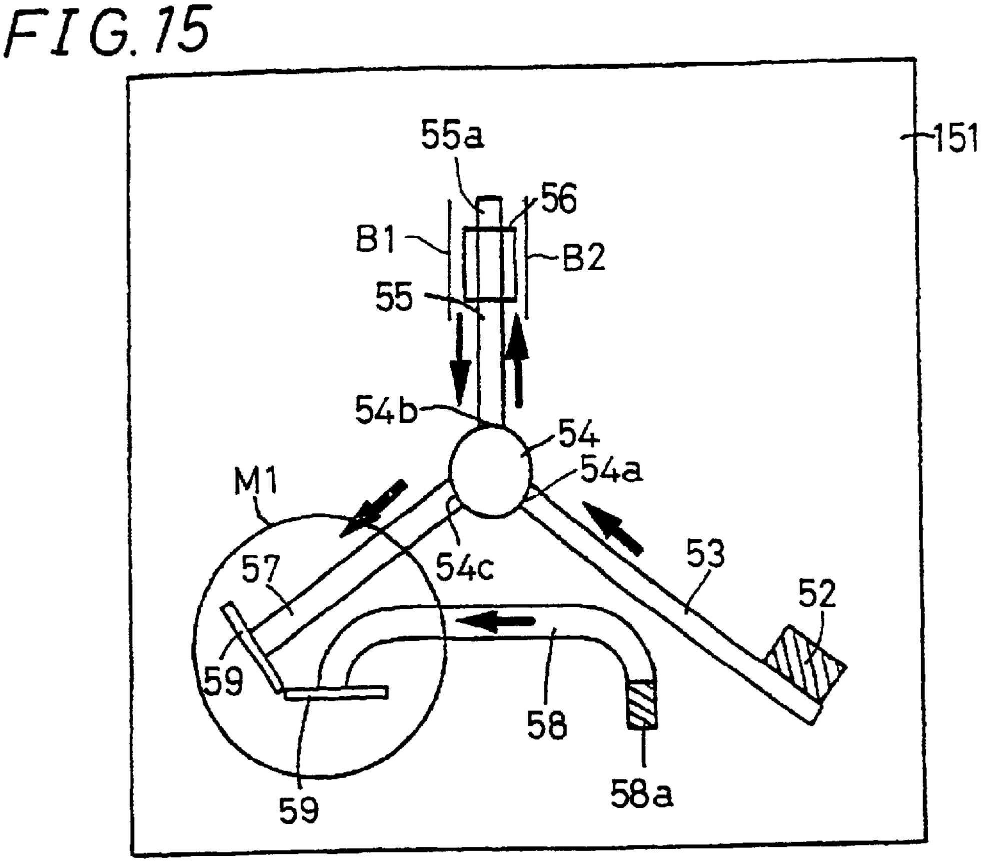
FIG. 15 is a plan view of yet another embodiment of a millimeter wave transmitter/receiver of the NRD guide type in accordance with the invention.
Figure 16:
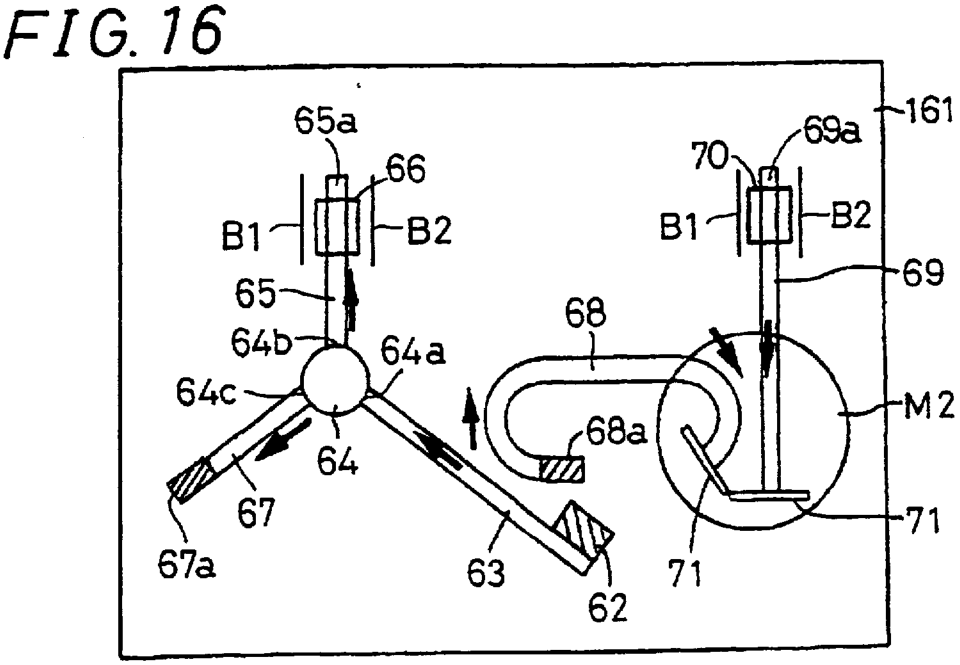
FIG. 16 is a plan view of yet another embodiment of a millimeter wave transmitter/receiver of the NRD guide type in accordance with the invention.

The following describes a millimeter wave transmitter/receiver in accordance with the invention. FIGS. 15 and 16 show such a millimeter wave transmitter/receiver in accordance with the invention. FIG. 15 is a plan view of a system, in which a receiving antenna and a transmitting antenna are integrated. FIG. 16 is a plan view of a system, in which a receiving antenna and a transmitting antenna are formed independently. In FIGS. 15 and 16, parts corresponding to those of the embodiment mentioned above of the invention are denoted by the same reference numerals and explanations thereof are omitted.

In FIG. 15, only one of the parallel planar conductors 151 of the invention is shown, but the other one has been omitted from the drawings. The parallel planar conductor 151 is provided with constitutions the same as those as shown in FIG. 7, except for the conductive member 55*b*. Instead of the conductive member 55*b*, electromagnetic shielding members B1, B2 are arranged along the two side faces of the terminal end 55*a* of the third dielectric strip 55. In the embodiment, the third dielectric strip 55 corresponds to the dielectric strip 103 of FIG. 11A.

In the millimeter wave transmitter/receiver in FIG. 15, which is similar to the embodiment of the invention as shown in FIG. 7, it is also possible to provide a switch in form of a modulator with the configuration shown in FIG. 10 at an intermediate portion of the first dielectric strip 53, to modulate the millimeter wave signals.

The same as the embodiment of the invention as shown in FIG. 7, a switch can also be made by providing a second circulator in the first dielectric strip 53, connecting the first dielectric strip 53 to the first and third connection portions of this circulator, connecting another dielectric strip to its second connection portion, and providing a Schottky barrier diode as shown in FIG. 10 at the end face of the front end portion of this dielectric strip.

As another embodiment of a millimeter wave transmitter/receiver in accordance with the invention, there is the type shown in FIG. 16, in which the transmitting antenna and the receiving antenna are independent. In FIG. 16, only one of the parallel planar conductors 161 of the invention is shown, but the other one has been omitted from the drawings. The parallel planar conductor 161 is provided with constitutions the same as those of FIG. 8, except for the conductive members 65*b*, 69*b*. In stead of the conductive members 65*b*, 69*b*, electromagnetic shielding members B1, B2 are arranged along the two side faces of each of the terminal ends 65*a*, 69*a* of the third and fourth dielectric strip 65, 69. In the embodiment, each of the third and fourth dielectric strips 65, 69 corresponds to the dielectric strip 103 of FIG. 11A.

In the millimeter wave transmitter/receiver in FIG. 16, which is similar to the embodiment as shown in FIG. 8, it is also possible to eliminate the circulator 64, and to connect the transmitting antenna 66 to the front end of the first dielectric strip 63. In that case, which is similar to the case in FIG. 8, the system can be made smaller, but a portion of the received wave is fed into the millimeter wave signal oscillator 62, which tends to cause noise, so that the configuration shown in FIG. 16 is preferable.

In the millimeter wave transmitter/receiver in FIG. 16, which is similar to the embodiment as shown in FIG. 8, a switch with the configuration shown in FIG. 10 can be provided at an intermediate portion of the first dielectric strip 63 in the millimeter wave transmitter/receiver in FIG. 16, and the millimeter wave signal can be amplitude modulated by controlling this switch with an amplitude modulation signal.

A switch can also be made by providing a second circulator in the first dielectric strip 63, which is similar to the embodiment as shown in FIG. 8, connecting the first dielectric strip 63 to the first and third connection portions of this circulator, connecting another dielectric strip to its second connection portion, and providing a Schottky barrier diode as shown in FIG. 10 at the end face of the front end portion of this dielectric strip.

In the configuration shown in FIG. 16, which is similar to the embodiment as shown in FIG. 8, it is also possible to arrange one end of the second dielectric strip 68 near the third dielectric strip 65 for electromagnetic coupling, or to join one end of the second dielectric strip 68 to the third dielectric strip 65, so that a portion of the millimeter wave signal is propagated toward the mixer 71.

Furthermore, in these millimeter wave transmitter/receivers, the distance between the parallel planar conductors is approximately the same as the wavelength of the millimeter wave signal in air, so that it is not more than half the wavelength at the usage frequency.

The millimeter wave transmitter/receiver of FIGS. 15 and 16 is of the frequency modulation continuous wave type. The operating principle of the frequency modulation continuous wave type is the same as that of FIGS. 8 and 9 and accordingly explanation thereof is omitted.

Thus, the millimeter wave transmitter/receiver of the invention, which has excellent millimeter wave signal transmission characteristics, can increase the detection distance of a millimeter wave radar (see millimeter wave transmitter/receiver in FIG. 15), and the millimeter wave signals for transmission are not fed through a circulator into a mixer, so that as a result, the noise of the received signal is reduced, and the detection distance can be increased (see millimeter wave transmitter/receiver in FIG. 16), and having excellent millimeter wave signal transmission characteristics, the detection distance of the millimeter wave radar can be increased even further.

WORKING EXAMPLE 1

The following is a description of a working example of the invention.

A structure for connecting an NRD guide and a metal waveguide as shown in FIGS. 1A to 1C and FIG. 4 was made as follows. First, the NRD guide of FIGS. 1A to 1C was prepared as follows: Two aluminum sheets of 6 mm thickness serving as the pair of parallel planar conductors 1, 2 were arranged in parallel at a distance of 1.8 mm, and a dielectric strip 3 made of cordierite ceramics with 0.8 mm width, 1.8 mm height, 60 mm length and a dielectric constant of 4.8 was placed between the parallel planar conductors 1, 2, thus producing the main portion of the NRD guide. Then, the connection structure shown in FIG. 1B was made on the side of the terminal end 3*a* of the dielectric strip 3. That is to say, centered on a position 3.2 mm from the end face of the terminal end 3*a* of the dielectric strip 3, a rectangular aperture 5 with a width W of 1.55 mm and a length L of 3.10 mm was formed in the parallel planar conductor 1.

Then, plate-shaped electromagnetic shielding members B1, B2, B3 made of aluminum were arranged as shown in FIG. 1C. That is to say, the electromagnetic shielding member B3 serving as the conductive member 3*b* was formed directly on the end face of the dielectric strip 3, and electromagnetic shielding portions B1, B2 were arranged at a certain distance from the side faces of the dielectric strip 3. The height b1 of the electromagnetic shielding members B1, B2, B3 was 1.8 mm, and the length c of the electromagnetic shielding members B1, and B2 was 6.67 mm. The distances d1, d2 of the electromagnetic shielding members B1 and B2 from the side faces of the dielectric strip 3 were 1.15 mm each.

Then, a metal waveguide 4 having substantially the same cross-sectional shape as the aperture 5 was connected to the aperture 5. For a connection structure with this configuration, the conversion loss s12 for conversion from TE-mode (in the metal waveguide 4) to LSM-mode (in the dielectric strip 3), the conversion loss s21 for conversion from LSM-mode (in the dielectric strip 3) to TE-mode (in the metal waveguide 4), the reflection loss s11 for reflection of the LSM-mode (in the dielectric strip 3), and the reflection loss s22 for reflection of the TE-mode (in the metal waveguide 4) were simulated by the finite elements method. The graph in FIG. 17 illustrates the results of this calculation.

Figure 17:
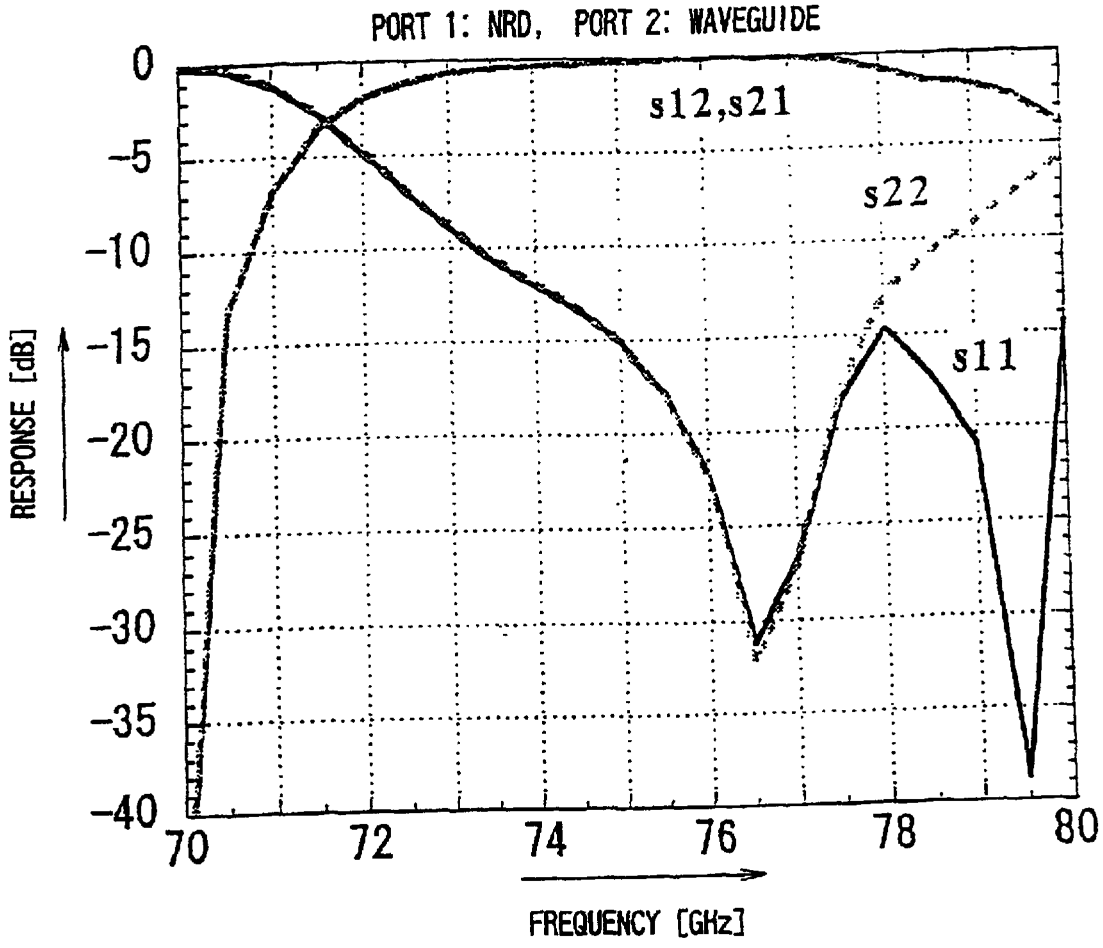
FIG. 17 is a graph illustrating the high-frequency signal transmission characteristics of the device shown in FIGS. 1A and 1C.

As becomes clear from the results in FIG. 17, superior conversion characteristics with both s12 and s21 less than 0.5 dB can be attained at ca. 75.5 GHz to ca. 77.0 GHz, which means that with this working example, a connection with low connection loss is possible.

Furthermore, a similar simulation was carried out for the system in FIG. 5, and similar results as for this working example were attained.

WORKING EXAMPLE 2

A structure for connecting an NRD guide and a metal waveguide as shown in FIGS. 11A and 11B and FIG. 12 was made as follows. First, the NRD guide of FIGS. 11A was prepared as follows: Two aluminum sheets of 6 mm thickness serving as the pair of parallel planar conductors 101, 102 were arranged in parallel at a distance of 1.8 mm, and a dielectric strip 103 made of cordierite ceramics with 0.8 mm width, 1.8 mm height, 60 mm length and a dielectric constant of 4.8 was placed between the parallel planar conductors 101, 102, thus producing the main portion of the NRD guide. Then, the connection structure shown in FIG. 11B was disposed on the top face of the main portion on the side of the terminal end 103*a* of the dielectric strip 103. That is to say, centered on a position 2.52 mm from the end face of the terminal end 103*a* of the dielectric strip 103, a rectangular aperture 105 with a width W of 1.55 mm and a length L of 3.10 mm was formed in the parallel planar conductor 101.

As shown in FIG. 11A, plate-shaped electromagnetic shielding members B1, B2 made of aluminum were arranged along both side faces of the dielectric strip 103 on the side of the terminal end 103. The height b1 of the electromagnetic shielding members B1, B2 was 1.8 mm, and the length c of the electromagnetic shielding members B1, B2 was 5.8 mm. The distances d1, d2 of the electromagnetic shielding members B1, B2 from the side faces of the dielectric strip 3 were 1.55 mm each.

Then, a metal waveguide 104 having substantially the same cross-sectional shape as the aperture 105 was connected to the aperture 105. For a connection structure with this configuration, the conversion loss s21 for conversion from TE-mode (in the metal waveguide 104) to LSM-mode (in the dielectric strip 103), the conversion loss s12 for conversion from LSM-mode (in the dielectric strip 103) to TE-mode (in the metal waveguide 104), and the reflection loss s11 for reflection were simulated by the finite elements method. The graph in FIG. 18 illustrates the results of this calculation.

Figure 18:
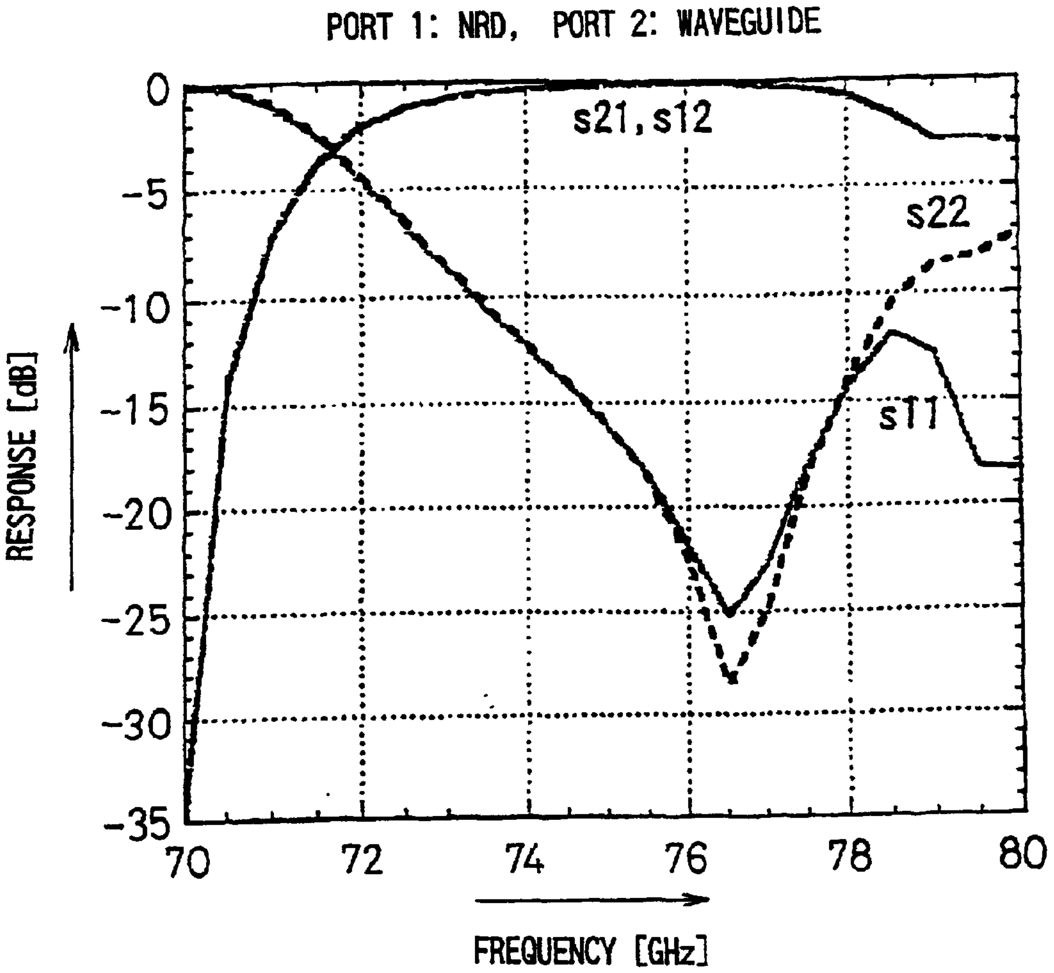
FIG. 18 is a graph illustrating the high-frequency signal transmission characteristics of the device shown in FIG. 11A.
Figure 19:
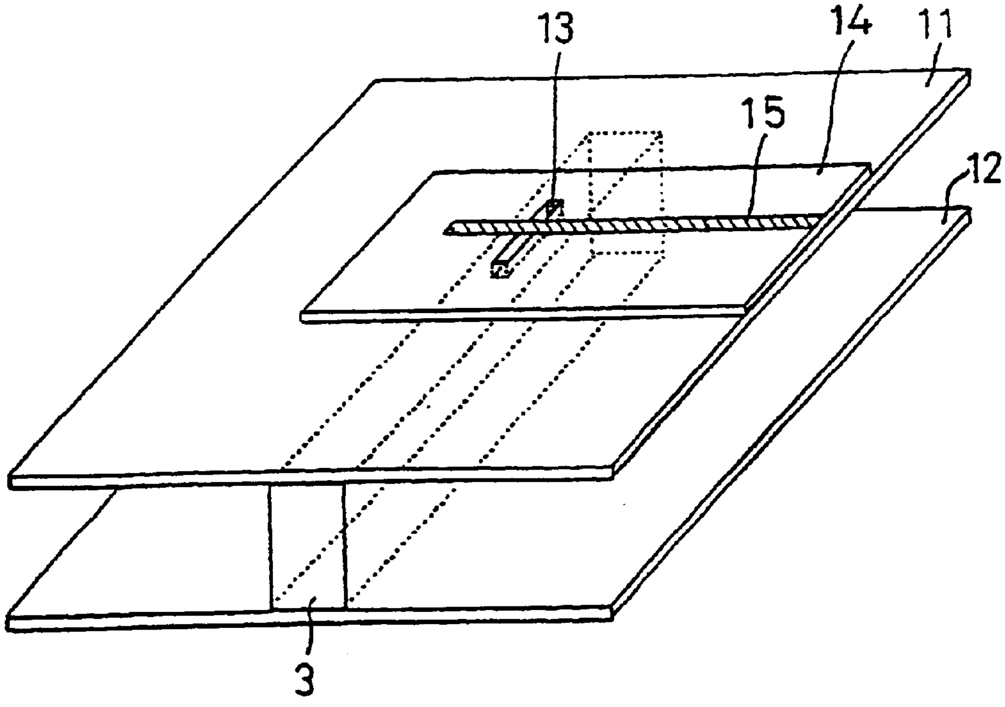
FIG. 19 PRIOR ART
FIG. 19 is a perspective view of a conventional example showing how a mictrostrip line is connected to an dielectric strip of an NRD guide.

As becomes clear from the results in FIG. 18, superior conversion characteristics with both s12 and s21 less than 0.5 dB can be attained at ca. 75.5 GHz to ca. 77.0 GHz, which means that with this working example, a connection with low connection loss is possible.

Furthermore, a similar simulation was carried out for the system in FIG. 13, and similar results as for this working example were attained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A structure for connecting a non-radiative dielectric waveguide and a metal waveguide comprising:

a non-radiative dielectric waveguide including:

parallel planar conductors arranged at a spacing of not more than half the wavelength of a high-frequency signal, a dielectric strip for propagating the high-frequency signal, the dielectric strip being disposed between the parallel planar conductors, and electromagnetic shielding members arranged along both sides of a terminal end of the dielectric strip; and a metal waveguide having an open terminal end connected to an aperture which is formed in at least one of the parallel planar conductors at a location where an electrical field of an LSM mode stationary wave propagating along the dielectric strip becomes largest.

2. The structure for connecting a non-radiative dielectric waveguide and a metal waveguide of claim 1, wherein electromagnetic shielding members are provided so as to enclose an end face and side faces of the terminal end of the dielectric strip.

3. A millimeter wave transmitting/receiving module comprising:

the connection structure of claim 2; and an aperture antenna or flat antenna connected to the open terminal of the metal waveguide of the connection structure.

4. The structure for connecting a non-radiative dielectric waveguide and a metal waveguide of claim 2, wherein the electromagnetic shielding member provided so as to enclose the end face of the terminal end of the dielectric strip is composed of a conductive member.

5. The structure for connecting a non-radiative dielectric wave guide and a metal waveguide of claim 2, wherein a conductive member is further provided on the end face of the terminal end, and a shape of the conductive member is substantially the same as that of the end face of the terminal end.

6. A millimeter wave transmitting/receiving module comprising:

the connection structure of claim 1; and an aperture antenna or flat antenna connected to the open terminal of the metal waveguide of the connection structure.

7. A structure for connecting a non-radiative dielectric waveguide and a metal waveguide comprising:

a non-radiative dielectric waveguide including:

parallel planar conductors arranged at a spacing of not more than half the wavelength of a high-frequency signal, a dielectric strip for propagating the high-frequency signal, the dielectric strip being disposed between the parallel planar conductors, and electromagnetic shielding members arranged along both sides of a terminal end of the dielectric strip; and a metal waveguide having terminal ends one of which is closed and the other of which is open, an aperture being formed in at least one of the parallel planar conductors at a location where an electrical field of an LSM mode stationary wave propagating along the dielectric strip becomes largest, the aperture being connected with an aperture provided in a lateral face of the metal waveguide having the closed terminal end and open terminal end, at a position of n/2+¼ (wherein n is an integer of 0 or greater) times the wavelength in the waveguide from the closed terminal.

8. The structure for connecting a non-radiative dielectric waveguide and a metal waveguide of claim 7, wherein electromagnetic shielding members are provided so as to enclose an end face and side faces of the terminal end of the dielectric strip.

9. A millimeter wave transmitting/receiving module comprising:

the connection structure of claim 8; and an aperture antenna or flat antenna connected to the open terminal of the metal waveguide of the connection structure.

10. The structure for connecting a non-radiative dielectric waveguide and a metal waveguide of claim 8, wherein the electromagnetic shielding member provided so as to enclose the end face of the terminal end of the dielectric strip is composed of a conductive member.

11. The structure for connecting a non-radiative dielectric waveguide and a metal waveguide of claim 8, wherein a conductive member is further provided on the end face of the terminal end, and a shape of the conductive member is substantially the same as that of the end face of the terminal end.

12. A millimeter wave transmitting/receiving module comprising:

the connection structure of claim 7; and an aperture antenna or flat antenna connected to the open terminal of the metal waveguide of the connection structure.

13. A millimeter wave transmitting/receiving module comprising:

a connection structure comprising:

a non-radiative dielectric waveguide including;

parallel planar conductors arranged at a spacing of no more than half the wavelength of a high-frequency signal, and a dielectric strip for propagating the high frequency signal, the dielectric strip being disposed between the parallel planar conductors and provided at an end face of a terminal end of the dielectric strip with a conductive member;

a metal waveguide having an open terminal end connected to an aperture which is formed in at least one of the parallel planar conductors at a location where an electric field of an LSM mode stationary wave propogating along the dielectric strip becomes largest; and an aperture antenna or flat antenna connected to the open terminal of the metal waveguide of the connection structure.

14. A millimeter wave transmitting/receiving module comprising:

a connection structure comprising;

a non-radiative dielectric waveguide including;

parallel planar conductors arranged at a spacing of not more than half the wavelength of high-frequency signal, and a dielectric strip for propagating the high-frequency signal, the dielectric strip being disposed between parallel planar conductors and provided at an end face of a terminal end of the dielectric strip with a conductive member; and a metal waveguide having terminal ends one of which is closed and the other of which is open, an aperture being formed is at least one of the parallel planar conductors at a location where an electrical field of an LSM mode stationary wave propagating along the dielectric strip becomes largest, the aperture being connected with an apeture provided in a lateral face of the metal waveguide having the closed terminal end and open terminal end, at a position of n/2+¼ (wherein n is an integer of 0 or greater) times the wavelength in the waveguide from the closed terminal; and an aperture antenna or flat antenna connected to the open terminal of the metal waveguide of the connection structure.

15. A millimeter wave transmitter/receiver comprising:

parallel planar conductors disposed at a spacing of not more than half the wavelength of the high-frequency signal, a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip, one end of the second dielectric strip being disposed near the first dielectric strip so as to be electromagnetically coupled, or being joined to the first dielectric strip;

a circulator having a first connection portion, a second connection portion, and a third connection portion arranged at predetermined spacings along a perimeter of a ferrite disk arranged in parallel to the parallel planar conductors, which connection portions serve as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitter/receiver antenna at a front end thereof;

a fourth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the fourth dielectric strip propagating a received wave that is received with the transmitter/receiver antenna, propagated along the third dielectric strip, and outputted from the third connection portion of the circulator, toward the mixer, the first to fourth dielectric strips, the variable capacitance diode, the circulator and the mixer portion of being arranged between the parallel planar conductors, wherein a conductive member is provided at an end face of a terminal end of the third dielectric strip, and an aperture is formed in at least one of the parallel planar conductors at a location where the electrical held of an LSM mode stationary wave propagating along the third dielectric strip becomes largest, the millimeter wave transmitter/receiver comprising:

a metal waveguide having an open terminal end connected to the aperture, and the other end at which the transmitter/receiver antenna is provided.

16. The millimeter wave transmitter/receiver of claim 15, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and a signal branching portion of the first dielectric strip and the second dielectric strip, such that a direction of an electric field of the millimeter wave signal coincides with a direction in which the bias voltage is applied to the amplitude modulation diode.

17. A millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip having one end disposed near the first dielectric strip so as to be electromagnetically coupled, or joined to the first dielectric strip;

a circulator having a first connection portion, a second connection portion, and a third connection portion arranged at predetermined spacings along a perimeter of a ferrite disk arranged in parallel to the parallel planar conductors, and serving as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitting antenna at a front end thereof;

a fourth dielectric strip provided with a receiving antenna at a front end thereof;

a fifth dielectric strip connected to the third connection portion of the circulator, for propagating a millimeter wave signal received and mixed with the transmitting antenna and attenuating the millimeter wave signal at a non-reflective terminal end arranged at a front end of the fifth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the mixer being provided at the other end of the fourth dielectric strip, the first to fifth dielectric stripe, the variable capacitance diode, the circulator and the mixer portion being arranged between the parallel planar conductors, wherein a conductive member is provided at an end face of a terminal end of each of the third and fourth dielectric strips, and an aperture is formed in at least one of the parallel planar conductors at a location where the electrical field of an LSM mode stationary wave propagating along each of the third and fourth dielectric strip becomes largest, the millimeter wave transmitter/receiver comprising:

metal waveguides having an open terminal end connected to the aperture, and the other end at which the transmitting antenna or the receiving antenna is provided.

18. The millimeter wave transmitter/receiver of claim 17, wherein one end of the second dielectric strip is placed near the third dielectric strip for electromagnetic coupling, or one end of the second dielectric strip is joined to the third dielectric strip, so that a portion of the millimeter wave signal is propagated toward the mixer.

19. The millimeter wave transmitter/receiver of claim 18, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and a signal branching portion of the first dielectric strip and the second dielectric strip, such that a direction of an electric field of the millimeter wave signal coincides with a direction in which the bias voltage is applied to the amplitude modulation diode.

20. The millimeter wave transmitter/receiver of claim 17, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and a signal branching portion of the first dielectric strip and the second dielectric strip, such that a direction of an electric field of the millimeter wave signal coincides with a direction in which the bias voltage is applied to the amplitude modulation diode.

21. A millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric held of the millimeter wave signal;

a second dielectric strip, one end of the second dielectric strip being disposed near the first dielectric strip so as to be electromagnetically coupled, or being joined to the first dielectric strip;

a circulator having a first connection portion, a second connection portion, and a third connection portion arranged at predetermined spacings along a perimeter of a ferrite disk arranged in parallel to the parallel planar conductors, which connection portions serve as input/output terminals for the millimeter wave signal, the circulator outputting the millimeter wave signal inputted into one of the connection portions from another connection portion that is adjacent in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitter/receiver antenna at a front end thereof;

a fourth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the fourth dielectric strip propagating a received wave that is received with the transmitter/receiver antenna, propagated along the third dielectric strip, and outputted from the third connection portion of the circulator, toward the mixer, the first to fourth dielectric strips, the variable capacitance diode, the circulator and the mixer portion being arranged between the parallel planar conductors, wherein electromagnetic shielding members are provided along lateral faces of a terminal end of the third dielectric strip, and an aperture is formed in at least one of the parallel planar conductors at a location where the electrical field of an LSM mode stationary wave propagating along the third dielectric strip becomes largest, the millimeter wave transmitter/receiver comprising:

a metal waveguide having an open terminal end connected to the aperture, and the other end at which the transmitter/receiver antenna is provided.

22. The millimeter wave transmitter/receiver of claim 21, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and the signal branching portion of the first dielectric strip and the second dielectric strip, much that a direction of an electric field of the millimeter wave signal coincides with a direction in which a bias voltage is applied to the amplitude modulation diode.

23. A millimeter wave transmitter/receiver comprising:

parallel planar conductors disposed at a spacing of not more than half the wavelength of the high-frequency signal;

a first dielectric strip for propagating a millimeter wave signal that is output from a high-frequency generation element placed at one end of the first dielectric strip;

a variable capacitance diode for outputting the millimeter wave signal as a frequency modulated transmission millimeter wave signal, by periodically controlling a bias voltage applied to electrodes of the variable capacitance diode, the variable capacitance diode being disposed such that the direction in which this bias voltage is applied coincides with the direction of an electric field of the millimeter wave signal;

a second dielectric strip having one end disposed near the first dielectric strip so as to be electromagnetically coupled, or joined to the first dielectric strip;

a circulator having a first connection portion, a second connection portion, and a third connection portion arranged at predetermined spacings along a perimeter of a ferrite disk arranged in parallel to the parallel planar conductors, and serving as input/output terminals for the millimeter wave signal, the circulator outputting the millimeter wave signal inputted into one of the connection portions from another connection portion that is adjacent; in clockwise or anti-clockwise circulation within a plane of the ferrite disk, the first connection portion being connected to an output terminal of the millimeter wave signal of the first dielectric strip;

a third dielectric strip for propagating the millimeter wave signal, which is joined to the second connection portion of the circulator, and has a transmitting antenna at a front end thereof;

a fourth dielectric strip provided with a receiving antenna at a front end thereof;

a fifth dielectric strip connected to the third connection portion of the circulator, for propagating a millimeter wave signal received and mixed with the transmitting antenna and attenuating the millimeter wave signal at a non-reflective terminal end arranged at a front end of the fifth dielectric strip; and a mixer portion for generating an intermediate frequency signal by mixing a portion of the millimeter wave signal and a received wave, the mixer portion being made by placing an intermediate portion of the second dielectric strip near an intermediate portion of the fourth dielectric strip to electromagnetically couple, or joining the second dielectric strip and the fourth dielectric strip together, the second dielectric strip propagating a portion of the millimeter wave signal toward a mixer, the mixer being provided at the other end of the fourth dielectric strip, the first to fifth dielectric strips, the variable capacitance diode, the circulator and the mixer portion being arranged between the parallel planar conductors, wherein an electromagnetic shielding member is provided along lateral faces of a terminal end of each of the third and fourth dielectric strips, and an aperture is formed in at least one of the parallel planar conductors at a location where the electrical field of an LSM mode stationary wave propagating along each of the third and fourth dielectric strip becomes largest, the millimeter wave transmitter/receiver comprising:

metal waveguides having an open terminal end connected to the aperture, and the other end at which the transmitting antenna or the receiving antenna is provided.

24. The millimeter wave transmitter/receiver of claim 23, wherein one end of the second dielectric strip is placed near the third dielectric strip for electromagnetic coupling, or one end of the second dielectric strip is joined to the third dielectric strip, so that a portion of the millimeter wave signal is propagated toward the mixer.

25. The millimeter wave transmitter/receiver of claim 24, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and the signal branching portion of the first dielectric strip and the second dielectric strip, such that a direction of an electric field of the millimeter wave signal coincides with a direction in which a bias voltage is applied to the amplitude modulation diode.

26. The millimeter wave transmitter/receiver of claim 23, wherein an amplitude modulation diode, with which amplitude modulation of the millimeter wave signal is performed by controlling a bias voltage with an amplitude modulation signal and which outputs the millimeter wave signal as a transmission millimeter wave signal, is placed between the circulator and the signal branching portion of the first dielectric strip and the second dielectric strip, such that a direction of an electric field of the millimeter wave signal coincides with a direction in which a bias voltage is applied to the amplitude modulation diode.

* * * * *